United States Patent
You et al.

(10) Patent No.: US 11,496,952 B2
(45) Date of Patent: *Nov. 8, 2022

(54) METHOD FOR PERFORMING DETECTION BY NODE IN WIRELESS COMMUNICATION SYSTEM AND NODE USING SAME METHOD

(71) Applicant: LG ELECTRONICS INC., Seoul (KR)

(72) Inventors: Hyangsun You, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 106 days.

This patent is subject to a terminal disclaimer.

(21) Appl. No.: 17/038,834

(22) Filed: Sep. 30, 2020

(65) Prior Publication Data
US 2021/0014777 A1  Jan. 14, 2021

Related U.S. Application Data

(63) Continuation of application No. 16/724,134, filed on Dec. 20, 2019, now Pat. No. 10,841,871, which is a (Continued)

(30) Foreign Application Priority Data

May 25, 2018 (KR) .................. 10-2018-0059334
Jul. 27, 2018 (KR) .................. 10-2018-0087673
Aug. 10, 2018 (KR) .................. 10-2018-0094053

(51) Int. Cl.
*H04W 48/16* (2009.01)
*H04W 16/28* (2009.01)
*H04W 56/00* (2009.01)

(52) U.S. Cl.
CPC .......... *H04W 48/16* (2013.01); *H04W 16/28* (2013.01); *H04W 56/001* (2013.01)

(58) Field of Classification Search
CPC .... H04W 48/16; H04W 16/28; H04W 56/001
See application file for complete search history.

(56) References Cited

U.S. PATENT DOCUMENTS 10,841,871 B2 * 11/2020 You ................... H04W 56/00
2018/0092139 A1    3/2018 Novlan et al.
(Continued)

FOREIGN PATENT DOCUMENTS

KR     20180022699      3/2018

OTHER PUBLICATIONS

Qualcomm Incorporated, "Inter-IAB-node discovery", R1-1807395, 3GPP TSG RAN WG1 Meeting #93, Busan, Korea, May 2018, 9 pages.

(Continued)

*Primary Examiner* — Melvin C Marcelo
(74) *Attorney, Agent, or Firm* — Lee Hong Degerman Kang Waimey

(57) ABSTRACT

Proposed is a method for performing detection by a first node in a wireless communication system. The method comprises: receiving detection configuration information from a second node; and when detection request information is received from the second node, transmitting a detection signal to a neighboring node on the basis of the detection configuration information, wherein the detection signal is aperiodically transmitted and is transmitted on the basis of beam sweeping.

10 Claims, 33 Drawing Sheets

Related U.S. Application Data continuation of application No. PCT/KR2019/006266, filed on May 24, 2019.

(56) References Cited

U.S. PATENT DOCUMENTS

2019/0349162 A1  11/2019  Qi et al.
2020/0145912 A1  5/2020   You et al.

OTHER PUBLICATIONS

KDDI Corporation et al., "Considerastion on IAB node discovery and connection establishment discussion", R2-1806739, 3GPP TSG RAN WG2 Meeting #102, Busan, Korea, May 2018, 5 pages.
AT&T, "IAB node discovery and route management procedures", R2-1808040, 3GPP TSG RAN WG2 Meeting #102, Busan, Korea, May 2018, 8 pages.
PCT International Application No. PCT/KR2019/006266, International Search Report dated Aug. 27, 2019, 4 pages.
Qualcomm Inc., "Inter-IAB-node discovery", R2-1808009, 3GPP TSG RAN WG2 Meeting #102, May 21-25, 2018. 6 pages.
Priority Document U.S. Appl. No. 16/410,309, GB 1807664.6, May 11, 2018. (Year: 2018).

\* cited by examiner

FIG. 17
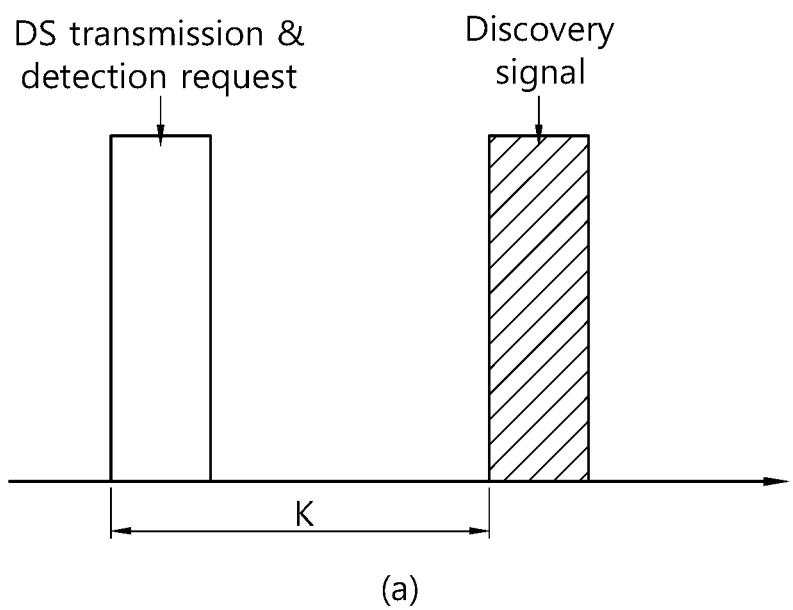
(a)
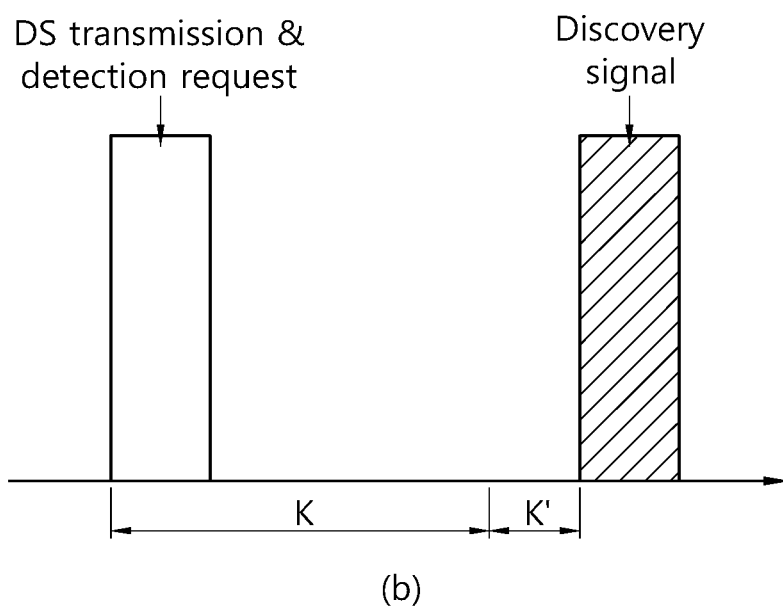
(b)

METHOD FOR PERFORMING DETECTION BY NODE IN WIRELESS COMMUNICATION SYSTEM AND NODE USING SAME METHOD

CROSS-REFERENCE TO RELATED APPLICATIONS

This application is a continuation of U.S. patent application Ser. No. 16/724,134, filed on Dec. 20, 2019, which is a continuation of International Application No. PCT/KR2019/006266, filed on May 24, 2019, which claims the benefit of earlier filing date and right of priority to Korean Patent Application Nos. 10-2018-0059334, filed on May 25, 2018, 10-2018-0087673, filed on Jul. 27, 2018, and 10-2018-0094053, filed on Aug. 10, 2018, the contents of which are all hereby incorporated by reference herein in their entirety.

BACKGROUNDS

Field of the Description

The disclosure relates to wireless communication and, more particularly, to a detection method performed by a node in a wireless communication system and a node using the same.

Related Art

As a growing number of communication devices require higher communication capacity, there is a need for advanced mobile broadband communication as compared to existing radio access technology (RAT). Massive machine-type communication (MTC), which provides a variety of services anytime and anywhere by connecting a plurality of devices and a plurality of objects, is also one major issue to be considered in next-generation communication. In addition, designs for communication systems considering services or user equipments (UEs) sensitive to reliability and latency are under discussion. Introduction of next-generation RAT considering enhanced mobile broadband communication, massive MTC, and ultra-reliable and low-latency communication (URLLC) is under discussion. In the disclosure, for convenience of description, this technology may be referred to as new RAT or new radio (NR).

One potential technology intended to enable future cellular network deployment scenarios and applications is supporting a wireless backhaul and a relay link, which enables a flexible and highly dense deployment of NR cells without needing to proportionally densify a transport network. It allows for flexible and very dense deployment.

With massive MIMO or a native deployment of multi-beam system, a greater bandwidth (e.g., mmWave spectrum) is expected to be available in NR than in LTE, and thus occasions for the development and deployment of integrated access and backhaul links arise. This allows an easy deployment of a dense network of self-backhauled NR cells in an integrated manner by establishing a plurality of control and data channels/procedures defined to provide connection or access to UEs.

For this next-generation scenario, a method for an IAB node to detect and measure another IAB node that is different from a conventional LT-based detection and measurement operation is required.

SUMMARY

An aspect of the disclosure is to provide a detection method performed by a node in a wireless communication system and a node using the same.

In one aspect, detection method performed by a first node in a wireless communication system is provided. The method comprises receiving detection configuration information from a second node and transmitting a detection signal to a neighboring node based on the detection configuration information upon receiving detection request information from the second node, wherein the detection signal is aperiodically transmitted, and the detection signal is transmitted on the basis of beam sweeping.

The first node may be connected with the second node via a backhaul link.

Data transmitted and received by the first node may be relayed by the second node.

The detection configuration information may be transmitted through system information or radio resource control (RRC).

The detection request information may be transmitted through downlink control information (DCI) or RRC.

The detection request information may be cell-specific or group-specific.

The first node may transmit the detection signal using a synchronization signal block (SSB) transmitted to a user equipment (UE), and the detection signal may be different from the SSB in at least one of transmission timing and resource allocation.

The detection configuration information may comprise detection signal reception configuration information, the first node may receive a different detection signal transmitted by the neighboring node based on the detection signal reception configuration information, and the detection signal reception configuration information may inform at least one of an identifier (ID) of the neighboring node, transmission timing of the different detection signal, and a reception beam direction list.

The first node may transmit detection feedback information about the different detection signal to the second node when receiving the different detection signal, and the detection feedback information may be aperiodically transmitted.

The detection feedback information may comprise at least one of the ID of the neighboring node, a best beam direction index, and a reference signal received power (RSRP) measurement result.

The first node may receive measurement configuration information from the second node, may transmit a first measurement signal to the neighboring node based on the measurement configuration information, and may receive a second measurement signal from the neighboring node based on the measurement configuration information, and the first measurement signal and the second measurement signal may be periodically transmitted.

The first node may perform measurement based on the first measurement signal and the second measurement signal and may select a particular node having a best channel quality from among neighboring nodes based on the measurement.

The first node may transmit measurement feedback information about the measurement to the second node, and the measurement feedback information may be periodically transmitted.

The first node may transmit the detection signal after specified duration after receiving the detection request information, and the specified duration may be configured independently for each node.

A transmission time for the detection signal may be preconfigured, and the first node may transmit the detection signal at a nearest transmission time after a specified offset from based on the detection request information being received.

The specified offset may be configured in advance or may be determined by the detection request information.

In another aspect, provided is a first node comprising a transceiver configured to transmit and receive a radio signal, and a processor configured to be operatively coupled with the transceiver, wherein the processor is configured to receive detection configuration information from a second node and transmit a detection signal to a neighboring node based on the detection configuration information upon receiving detection request information from the second node, the detection signal is aperiodically transmitted, and the detection signal is transmitted on the basis of beam sweeping.

The first node may communicate with at least one of a mobile terminal, a network, and a self-driving vehicle other than the first node.

In another aspect, provided is a processor of a wireless communication device in a wireless communication system, the processor controlling the wireless communication device to receive detection configuration information from a particular node, and to transmit a detection signal to a neighboring node based on the detection configuration information upon receiving detection request information from the particular node, wherein the detection signal is aperiodically transmitted, and the detection signal is transmitted based on beam sweeping.

The disclosure proposes a method in which an IAB node transmits a signal for discovering and measuring another IAB node and performs detection/discovery and measurement using the signal. Particularly, in detecting an IAB node, the IAB node aperiodically detects the target IAB node, making it possible to more efficiently perform detection than in a detection operation based on a conventional system.

BRIEF DESCRIPTION OF THE DRAWINGS

FIG. 17 schematically illustrates an example in which discovery signal transmission timing is applied according to the disclosure.

DESCRIPTION OF EXEMPLARY EMBODIMENTS

Figure 1:
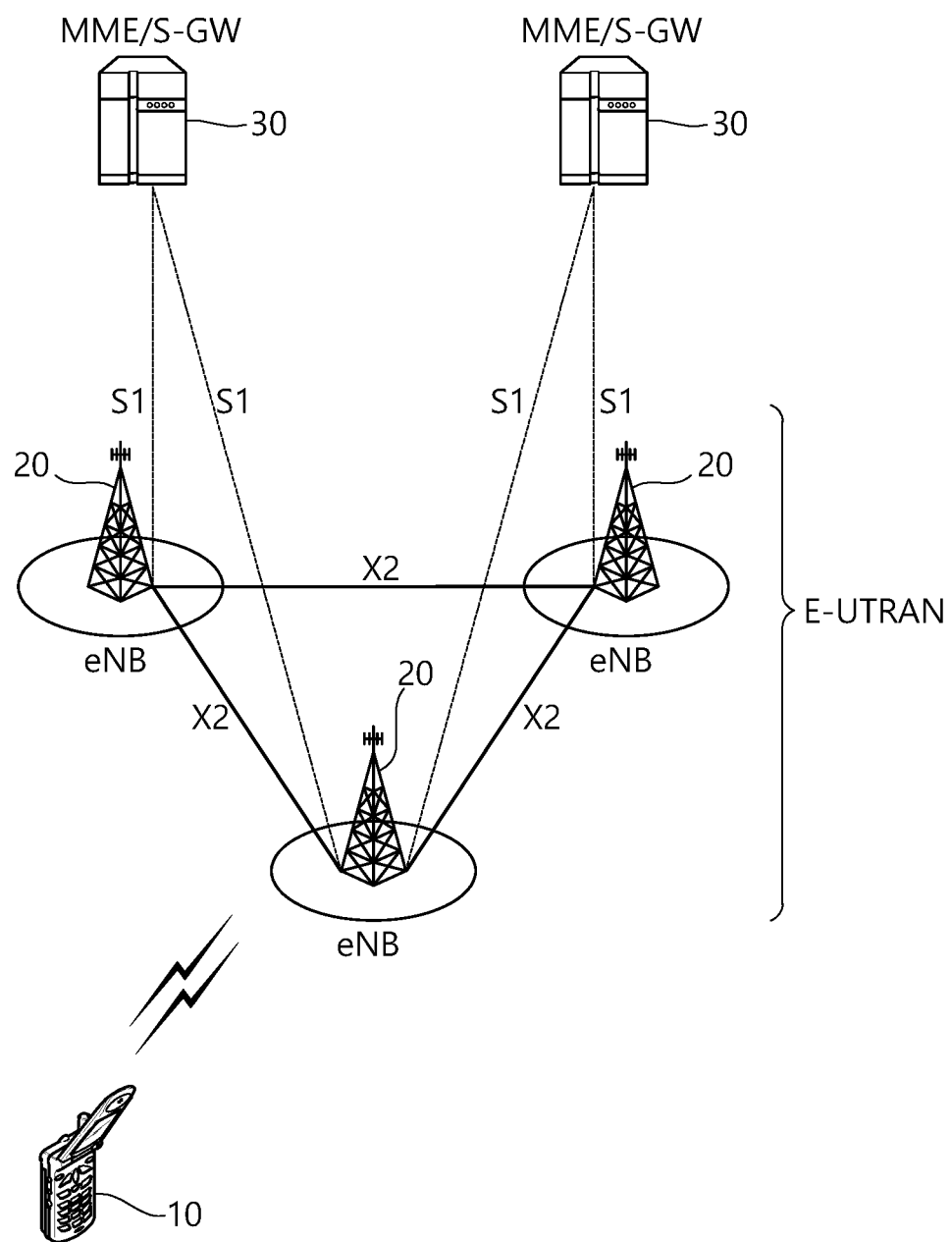
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
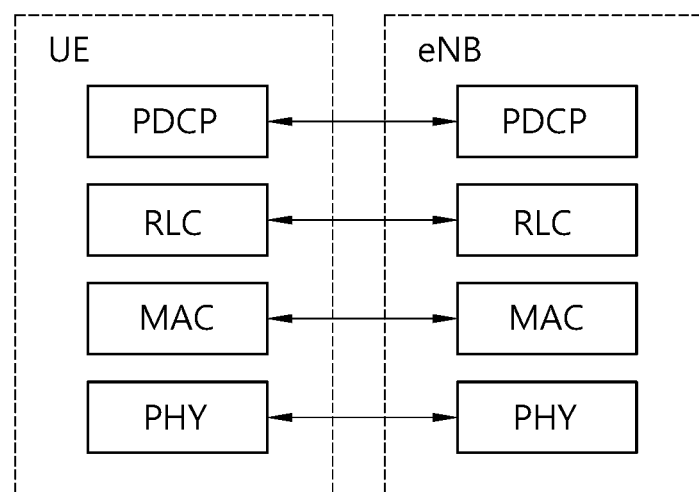
FIG. 2 is a diagram showing a wireless protocol architecture for a user plane.
Figure 3:
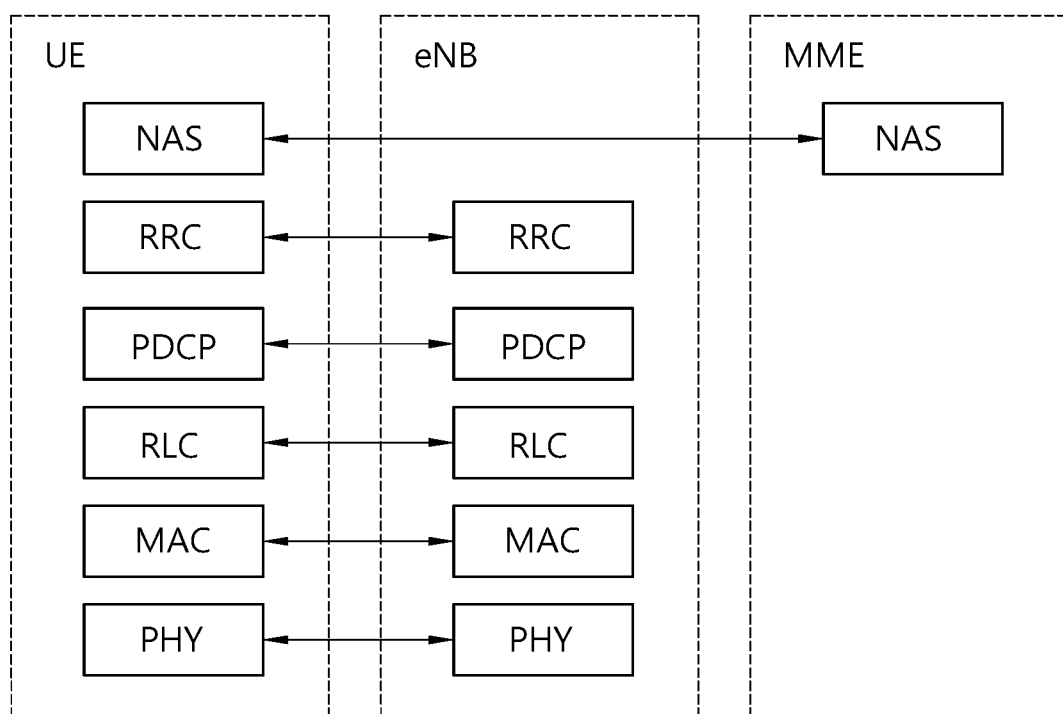
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/ latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience.

Figure 4:
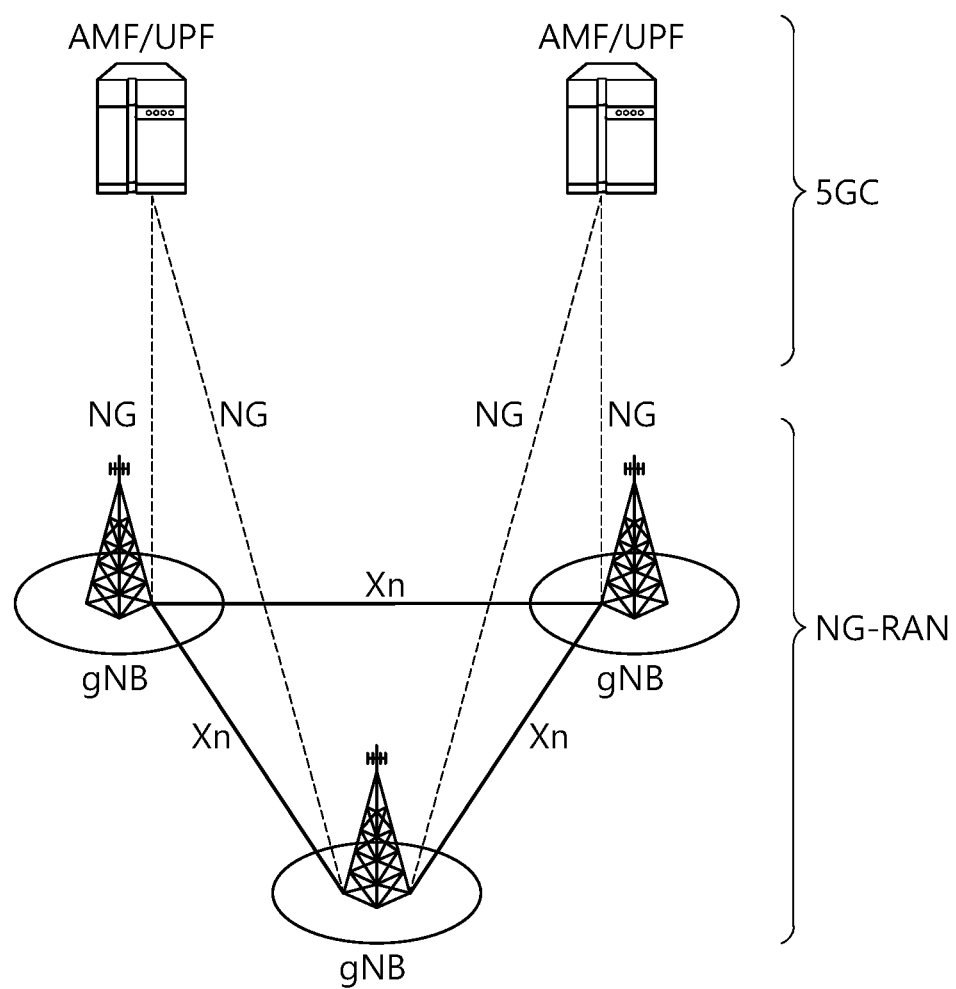
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
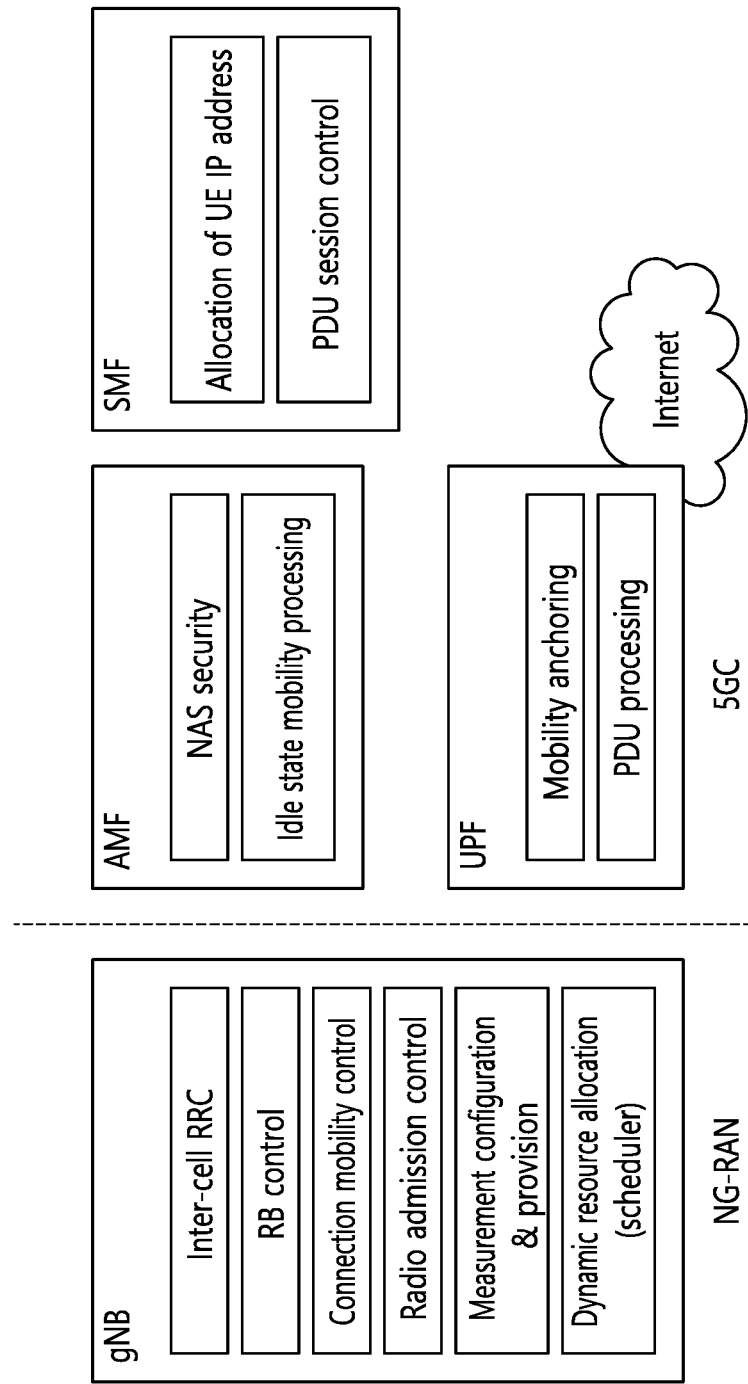
FIG. 5 illustrates a functional division between an NG-RAN and a 5GC.

FIG. 5 illustrates a functional division between an NG-RAN and a 5GC.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
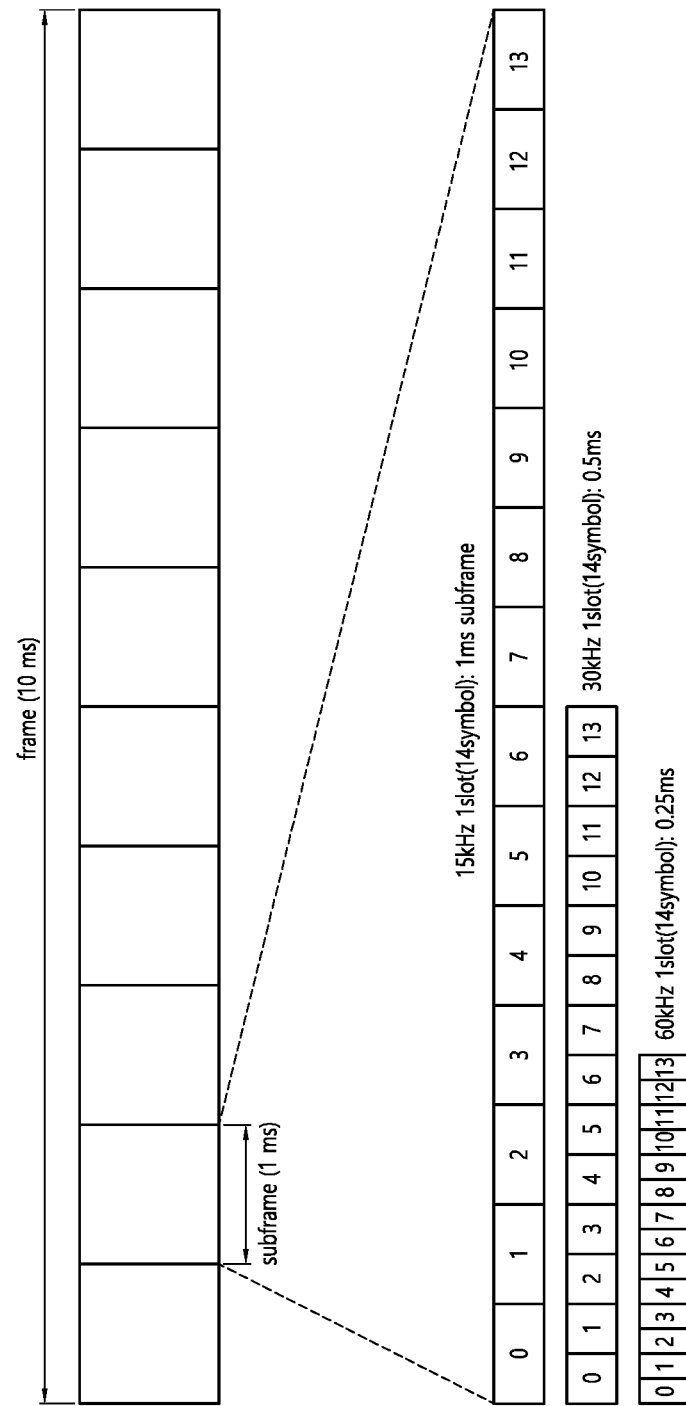
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration μ.

TABLE 1

| μ | $\Delta f = 2^\mu \cdot 15[\text{kHz}]$ | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{frame,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |

TABLE 2-continued

| μ | $N^{slot}_{symb}$ | $N^{frame,\mu}_{slot}$ | $N^{subframe,\mu}_{slot}$ |
|---|---|---|---|
| 3 | 14 | 80 | 8 |
| 4 | 14 | 160 | 16 |

In FIG. 6, μ=0, 1, 2 is illustrated.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 7:
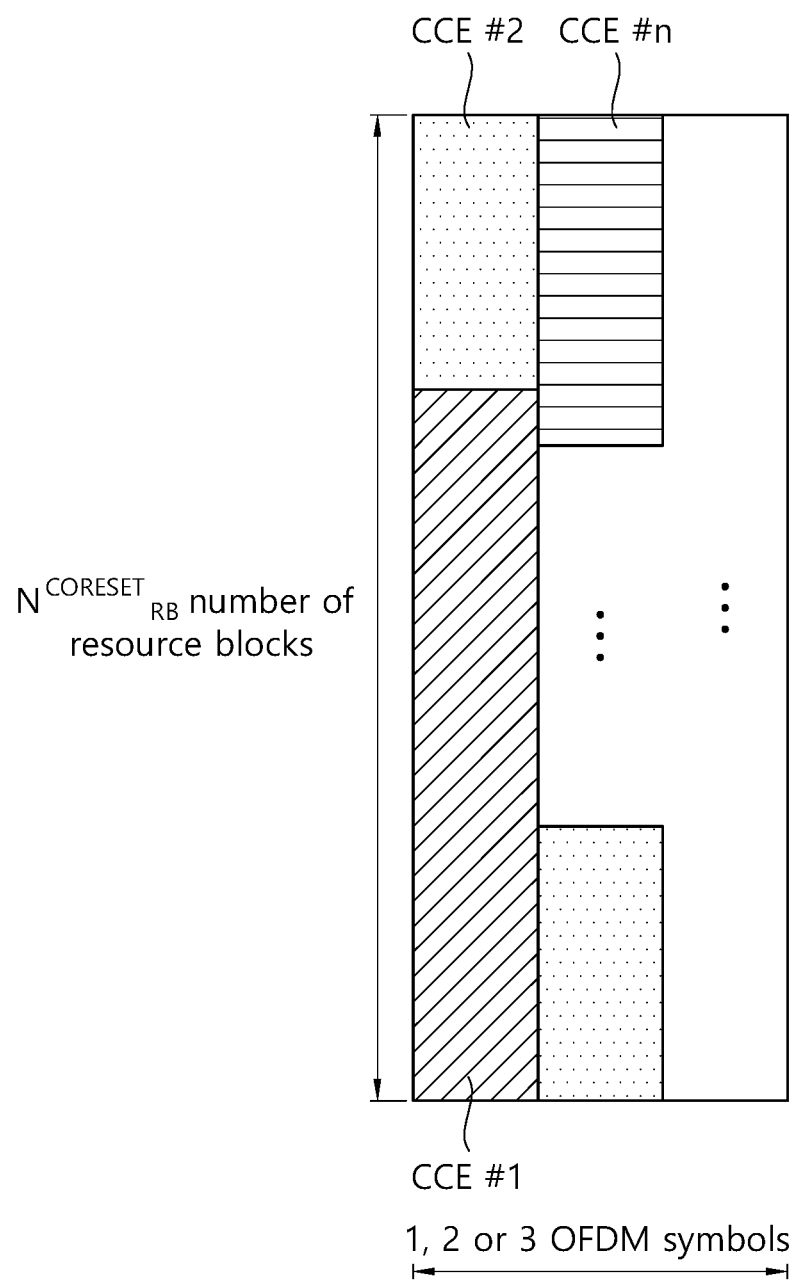
FIG. 7 illustrates CORESET.

FIG. 7 illustrates CORESET.

Referring to FIG. 7, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 8:
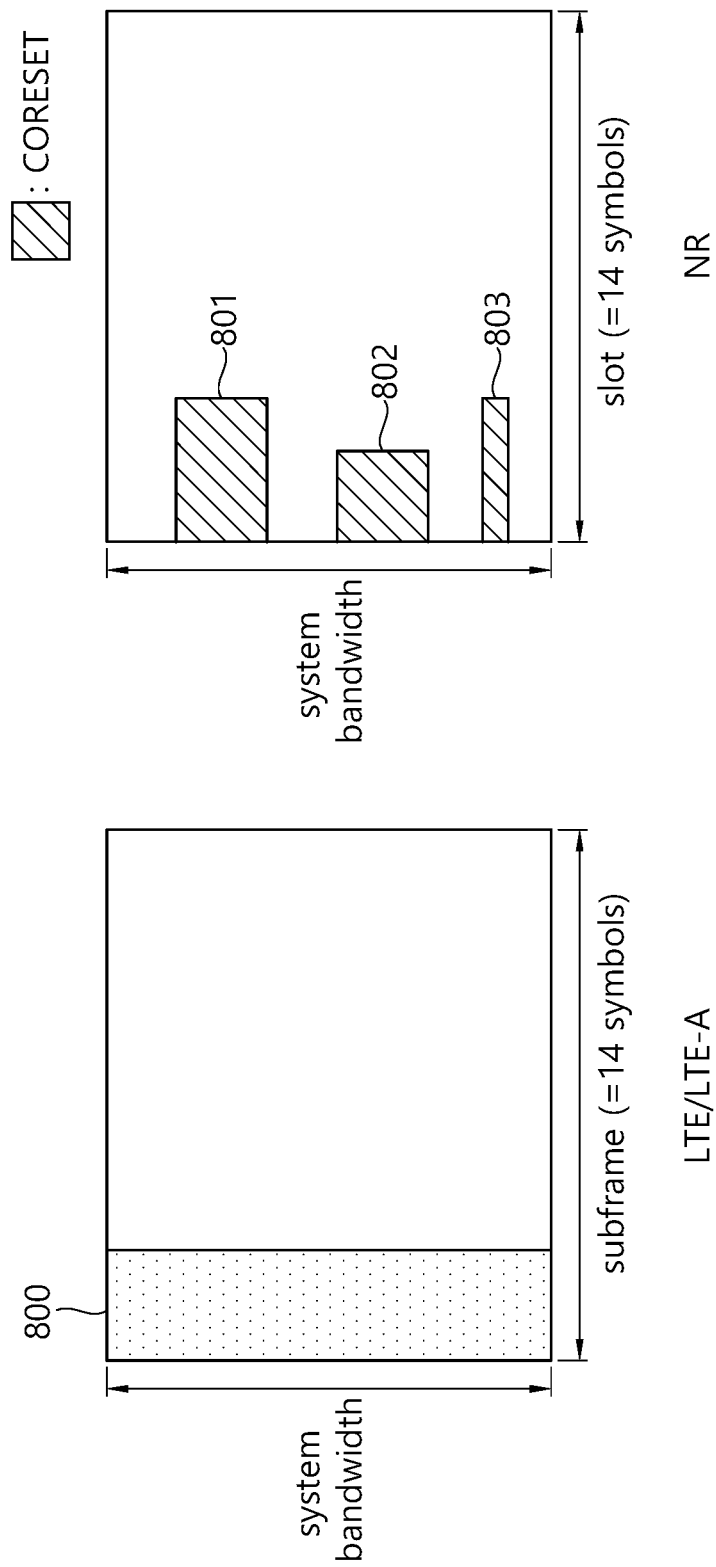
FIG. 8 is a diagram illustrating a difference between a related art control region and the CORESET in NR.

FIG. 8 is a diagram illustrating a difference between a related art control region and the CORESET in NR.

Referring to FIG. 8, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the terminal and may use only a portion, rather than the entirety of the system bandwidth. The BS may allocate the CORESET to each UE and may transmit control information through the allocated CORESET. For example, in FIG. 8, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 9:
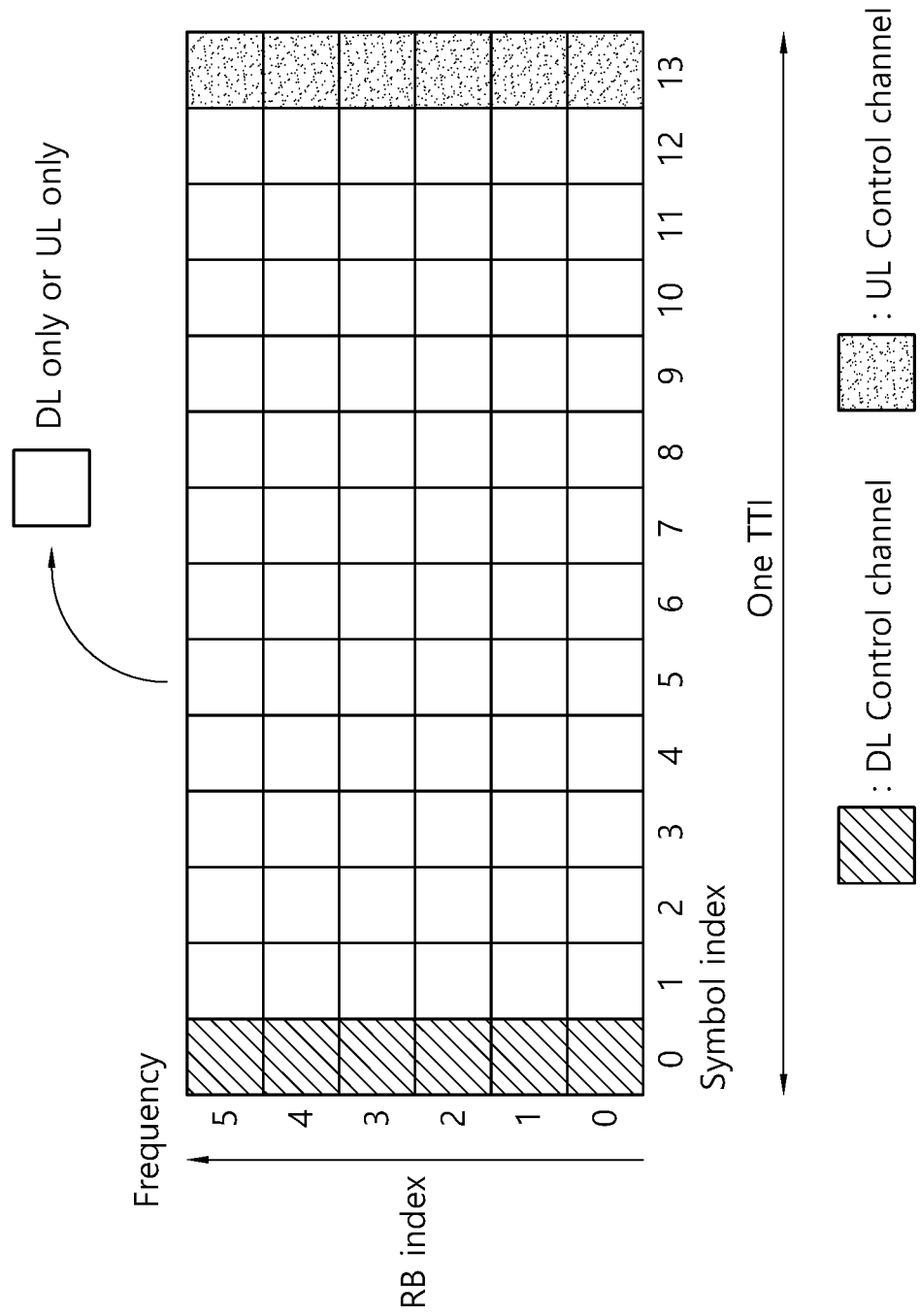
FIG. 9 illustrates an example of a frame structure for new radio access technology.

FIG. 9 illustrates an example of a frame structure for new radio access technology.

In NR, a structure in which a control channel and a data channel are time-division-multiplexed within one TTI, as shown in FIG. 9, can be considered as a frame structure in order to minimize latency.

In FIG. 9, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 10:
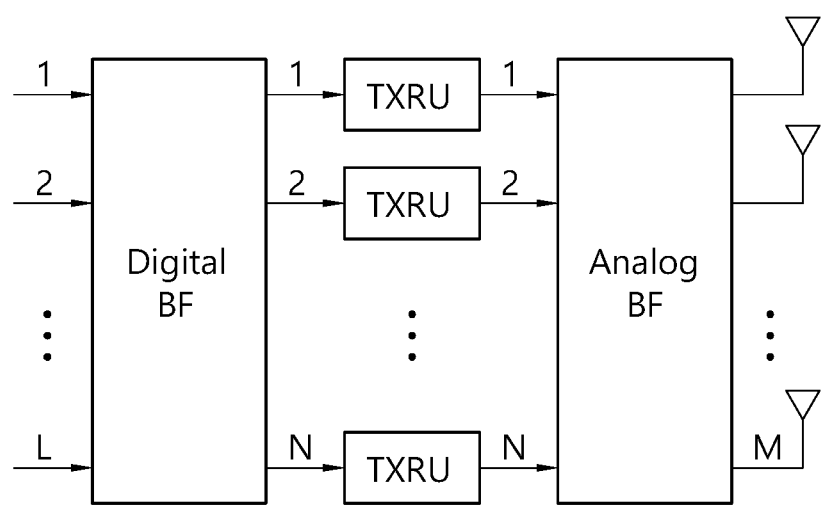
FIG. 10 is an abstract schematic diagram illustrating hybrid beamforming from the viewpoint of TXRUs and physical antennas.

FIG. 10 is an abstract schematic diagram illustrating hybrid beamforming from the viewpoint of TXRUs and physical antennas.

In FIG. 10, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 7, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 11:
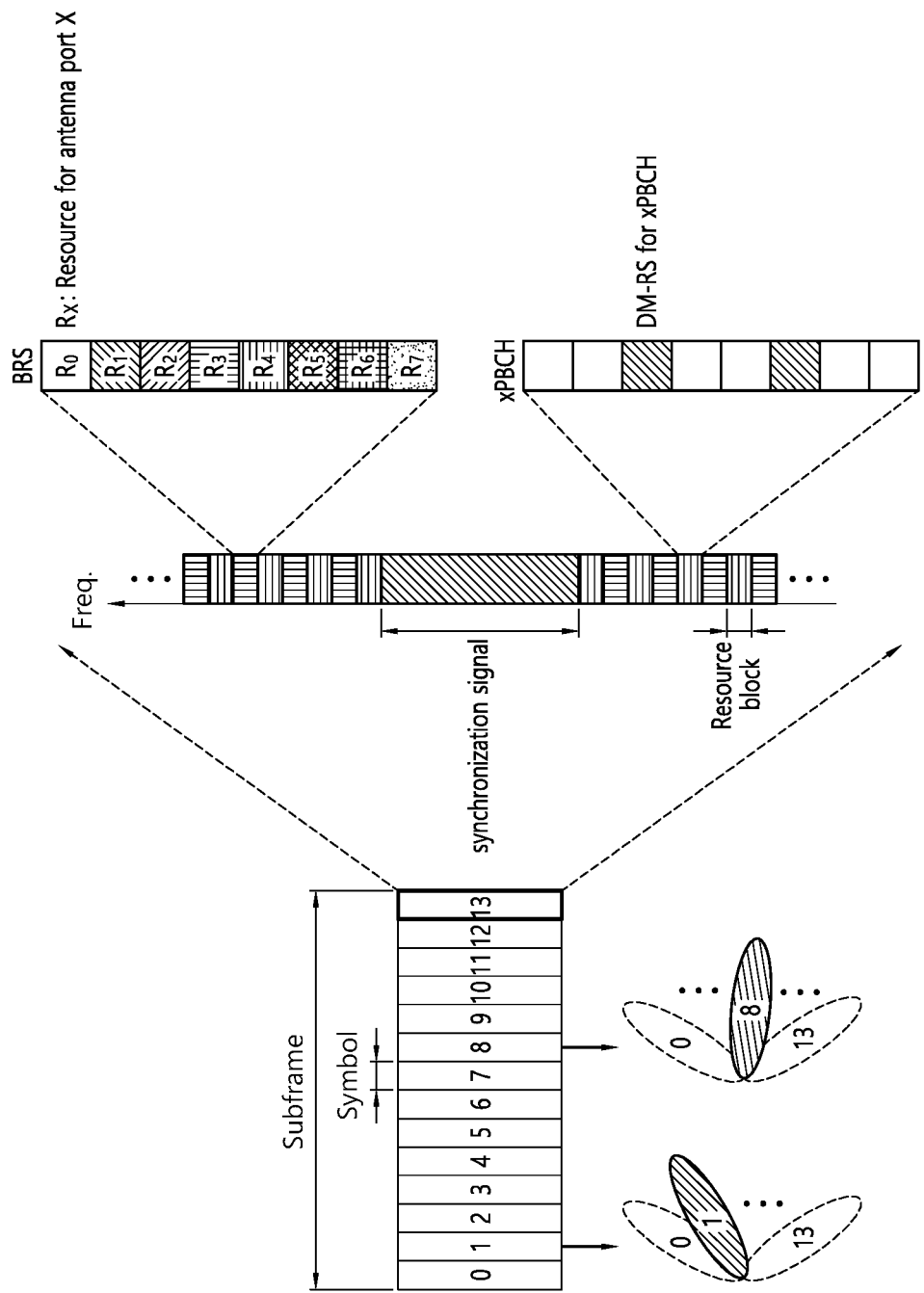
FIG. 11 illustrates the beam sweeping operation for a synchronization signal and system information in a downlink (DL) transmission procedure.

FIG. 11 illustrates the beam sweeping operation for a synchronization signal and system information in a downlink (DL) transmission procedure.

In FIG. 11, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam, as illustrated in FIG. 8, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

Hereinafter, an integrated access and backhual link (IAB) link will be described.

One of the potential technologies targeted to enable future cellular network deployment scenarios and applications is the support for wireless backhaul and relay links enabling flexible and very dense deployment of NR cells without the need for densifying the transport network proportionately.

Due to the expected larger bandwidth available for NR compared to LTE (e.g. mmWave spectrum) along with the native deployment of massive MIMO or multi-beam systems in NR creates an opportunity to develop and deploy integrated access and backhaul links. This may allow easier deployment of a dense network of self-backhauled NR cells in a more integrated manner by building upon many of the control and data channels/procedures defined for providing access to UEs.

Figure 12:
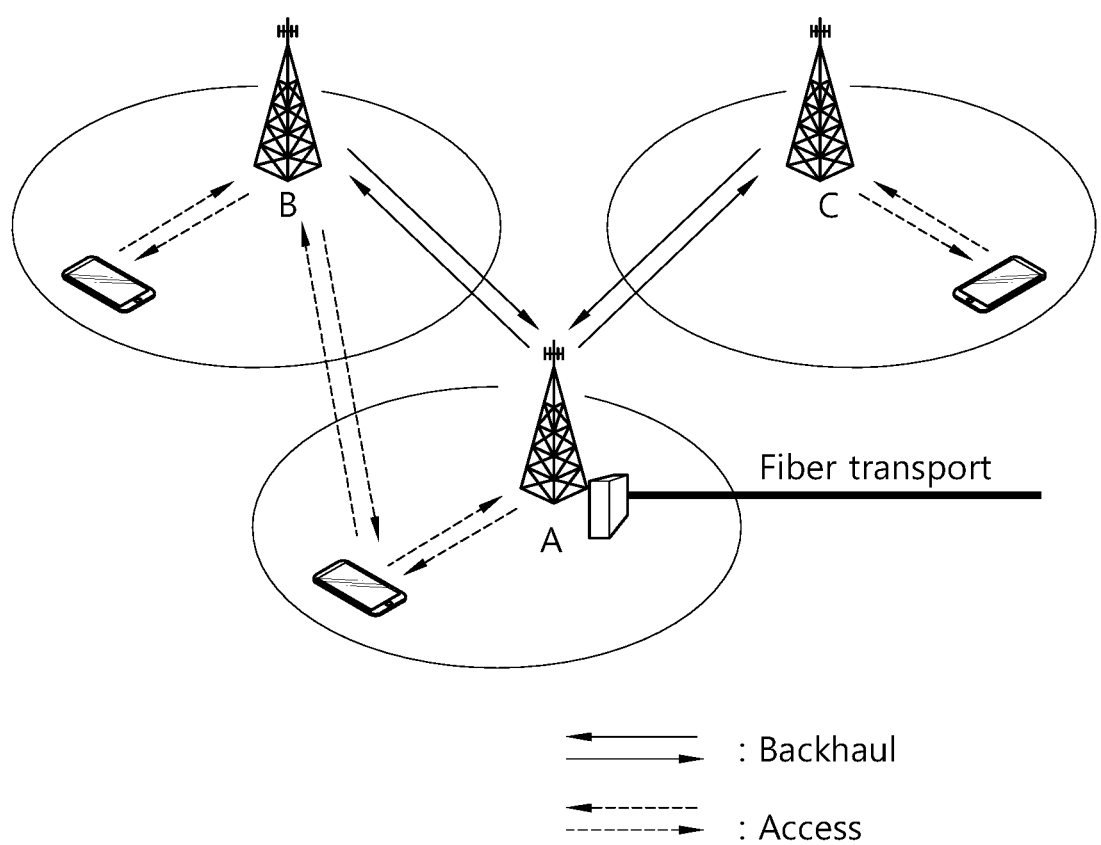
FIG. 12 schematically illustrates an example of a network having an IAB link.

FIG. 12 schematically illustrates an example of a network having an IAB link.

Referring to FIG. 12, relay nodes (rTRP) may multiplex access and backhaul links in a time, frequency, or space domain (i.e., a beam-based operation).

The operation of the different links may be on the same or different frequencies (also termed 'in-band' and 'out-band' relays). While efficient support of out-band relays is important for some NR deployment scenarios, it is critically important to understand the requirements of in-band operation which imply tighter interworking with the access links operating on the same frequency to accommodate duplex constraints and avoid/mitigate interference.

In addition, operating NR systems in mmWave spectrum presents some unique challenges including experiencing severe short-term blocking that may not be readily mitigated by present RRC-based handover mechanisms due to the larger time-scales required for completion of the procedures compared to short-term blocking. Overcoming short-term blocking in mmWave systems may require fast RAN-based mechanisms for switching between rTRPs, which do not necessarily require involvement of the core network. The above described need to mitigate short-term blocking for NR operation in mmWave spectrum along with the desire for easier deployment of self-backhauled NR cells creates a need for the development of an integrated framework that allows fast switching of access and backhaul links. Over-the-air (OTA) coordination between rTRPs can also be considered to mitigate interference and support end-to-end route selection and optimization.

The following requirements and aspects should be addressed by the integrated access and wireless backhaul (IAB) for NR:
  Efficient and flexible operation for both inband and out-band relaying in indoor and outdoor scenarios
  Multi-hop and redundant connectivity
  End-to-end route selection and optimization
  Support of backhaul links with high spectral efficiency
  Support of legacy NR UEs Legacy New RAT is designed to support half-duplex devices. We also thinks half-duplex in IAB scenario deserves to be supported and targeted. In addition, IAB devices with full duplex also can be studied.

In IAB scenario, if each relay node (RN) doesn't have scheduling ability, a Donor gNB (DgNB) should schedules the entire links among the DgNB, associated RNs, and UEs. In other words, a DgNB should make scheduling decisions for all links by gathers traffic information from the entire associated RNs, then inform the scheduling information to each RN.

Figure 13:
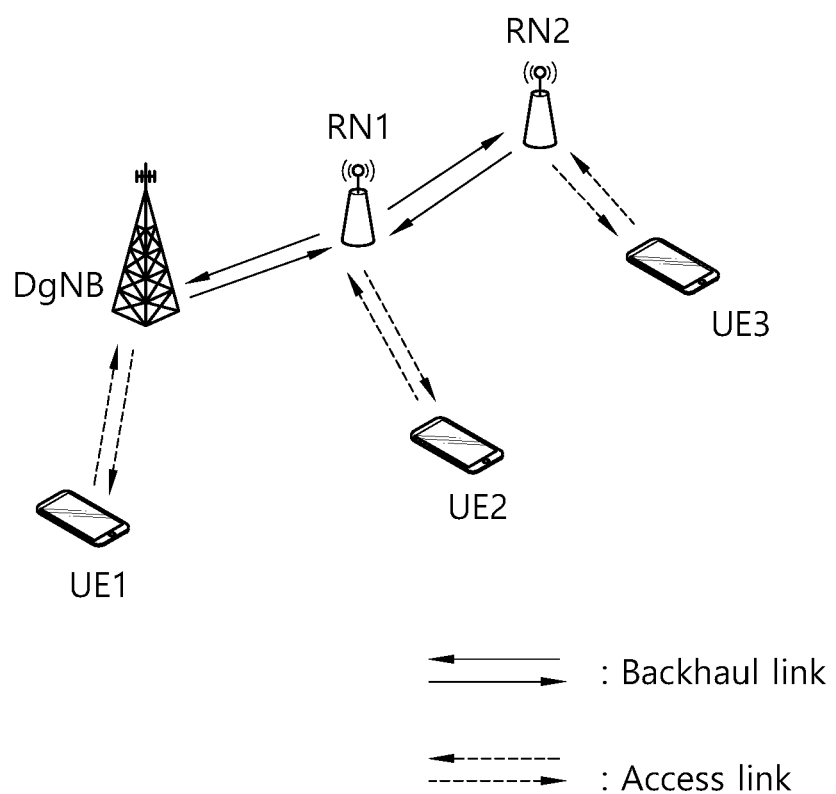
FIG. 13 schematically illustrates an example of the configuration of access and backhaul links.

FIG. 13 schematically illustrates an example of the configuration of access and backhaul links.

Referring to FIG. 13, the DgNB not only receive scheduling request of UE1, but also receive scheduling request of UE2 and UE3. Then, it makes scheduling decision of two backhaul links and three access links, and inform the scheduling results. Therefore, this centralized scheduling would involve scheduling delay and cause latency issue.

In the other hand, distributed scheduling can be made if each RN has scheduling ability. Then, immediate scheduling can be made for uplink scheduling request of UE, and backhaul/access links can be utilized more flexibly by reflecting the surrounding traffic situation.

Hereinafter, the disclosure will be described.

The disclosure proposes a method in which an IAB node transmits signals for discovery and measurement of another IAB node and performs discovery and measurement using the signals in a new RAT environment. Here, the signals used for the discovery and measurement may be referred to as a discovery signal and a measurement signal, respectively.

In the disclosure, for the convenience of description, the proposed method will be described on the basis of a new RAT (NR) system. However, the proposed method may also be applicable to other systems, such as 3GPP LTE/LTE-A systems, in addition to the new RAT system.

Further, the disclosure is described in view of an in-band environment but may also be applied to an out-band environment.

In addition, the disclosure is described in view of an environment in which a donor gNB (DgNB), a relay node (RN), and a UE perform a half-duplex operation but may also be applied to an environment in which a DgNB, an RN, and/or a UE perform a full-duplex operation.

In the disclosure, for the convenience of description, when RN 1 and RN 2 exist, and RN 1 is connected to RN 2 via a backhaul link and relays data transmitted to/received from RN 2, RN 1 is referred to as a parent node of RN 2, and RN 2 is referred to as a child node of RN 1.

As used herein, a discovery signal is a signal transmitted by an IAB node, which is a signal transmitted to enable other IAB nodes or UEs to discover the IAB node.

This discovery signal may be in the form of a synchronization signal block (SSB) according to an NR specification, in the form of a channel state information-reference signal (CSI-RS), or in the form of a signal adopted according to different existing NR. Alternatively, the discovery signal may be a newly designed signal. In NR, in the time domain, a synchronization signal block (SSB, a synchronization signal and a physical broadcast channel (PBCH)) may include four OFDM symbols numbered from 0 to 3 in ascending order in the synchronization signal block, and a PBCH associated with a primary synchronization signal (PSS), a secondary synchronization signal (SSS), and a demodulation reference signal (DMRS) may be mapped to the symbols. The synchronization signal block may also be referred to as an SS/PBCH block.

The disclosure mainly illustrates an IAB node discovering other IAB nodes but may also be applied to a case where a UE discovers IAB nodes.

Figure 14:
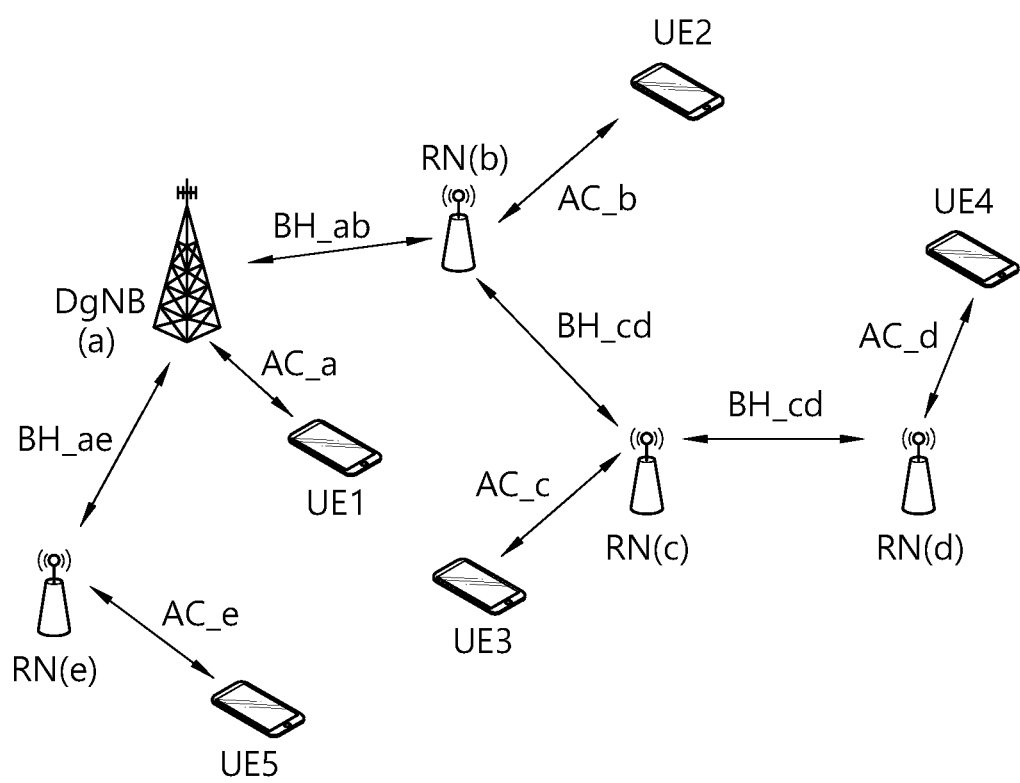
FIG. 14 schematically illustrates an example in which a backhaul link and an access link are configured when there are a DgNB and IAB relay nodes.

FIG. 14 schematically illustrates an example in which a backhaul link and an access link are configured when there are a DgNB and IAB relay nodes.

According to FIG. 14, RN(b) and RN(e) are connected to DgNB(a) via backhaul links, RN(c) is connected to RN(b) via a backhaul link, and RN(d) is connected to RN(c) via a backhaul link.

In the disclosure, a backhaul link between node (x) and node (y) is referred to as BH_xy. An access link between node (x) and a UE is referred to as AC_x. Referring to FIG. 14, an access link between DgNB(a) and UE may be referred to as AC_a, an access link between RN(c) and UE3 may be referred to as AC_c. Further, in FIG. 14, the backhaul link between RN(b) and RN(c) may be referred to as BH_bc.

Hereinafter, a method for transmitting and receiving a discovery signal according to the type of a used signal will be described.

In the disclosure, a discovery signal may mean a signal for detecting and/or measuring another node. When a discovery signal is used separately as a signal for detection or a signal for measurement, the following disclosure may be applied only to the signal for detection, only to the signal for measurement, or both of the signals.

First, discovery signal transmission based on a synchronization signal block (SSB) will be described.

In NR, in the time domain, a synchronization signal block (SSB, a synchronization signal and a physical broadcast channel (PBCH)) may include four OFDM symbols numbered from 0 to 3 in ascending order in the synchronization signal block, and a PBCH associated with a primary synchronization signal (PSS), a secondary synchronization signal (SSS), and a demodulation reference signal (DMRS) may be mapped to the symbols. The synchronization signal block may also be referred to as an SS/PBCH block.

In order for an IAB node to discover other IAB nodes, a conventionally transmitted SSB may be used as a discovery signal. That is, instead of defining and transmitting a separate additional discovery signal, an RN may discover another node using an existing SSB.

However, as described below, an SSB according to the disclosure may be the same as an existing SSB that a base station transmits to a UE but may be different from the foregoing SSB according to NR in terms of configuration, a resource allocation method, and the like. That is, the SSB according to the disclosure may be an SSB transmitted through a backhaul link between base stations, which may be referred to as a backhaul-SSB. Here, a backhaul-SSB may be the same as or different from the SSB that a base station transmits to a UE.

When an RN performs a half-duplex operation, the RN cannot transmit an SBS and receive an SBS at the same time. Therefore, for the RN to receive an SSB transmitted by a different node, nodes that need to discover each other needs to transmit SSBs at different positions (orthogonal positions). However, a conventional SSB transmission method may make it difficult for the nodes to transmit SSBs using orthogonal resources.

Therefore, in order to increase flexibility of SSB transmission resources, the disclosure proposes applying an offset to a frame boundary (or system frame boundary) between nodes.

In this case, SSB transmission times for the nodes may be different, and thus the nodes are more likely to transmit SSBs using orthogonal resources.

To this end, a frame boundary offset (or system frame boundary offset) may be determined as follows.

[Method A]

A frame boundary offset (or system frame boundary offset) for an RN may vary depending on the number of hops from a DgNB to the RN. Defining the number of hops from the DgNB to RN(x) is C_x, the frame boundary (or system frame boundary) of RN(x) has an offset of $\alpha$*C_x symbols/mini-slots/slots/subframes/frames from the frame boundary (or system frame boundary) of the DgNB. It is offset by. Particularly, when the maximum offset value (e.g., C_max) is limited, the frame boundary (or system frame boundary) of RN(x) may have an offset of $\alpha$*C_x mod C_max symbols/mini-slots/slots/subframes/frames.

Figure 15:
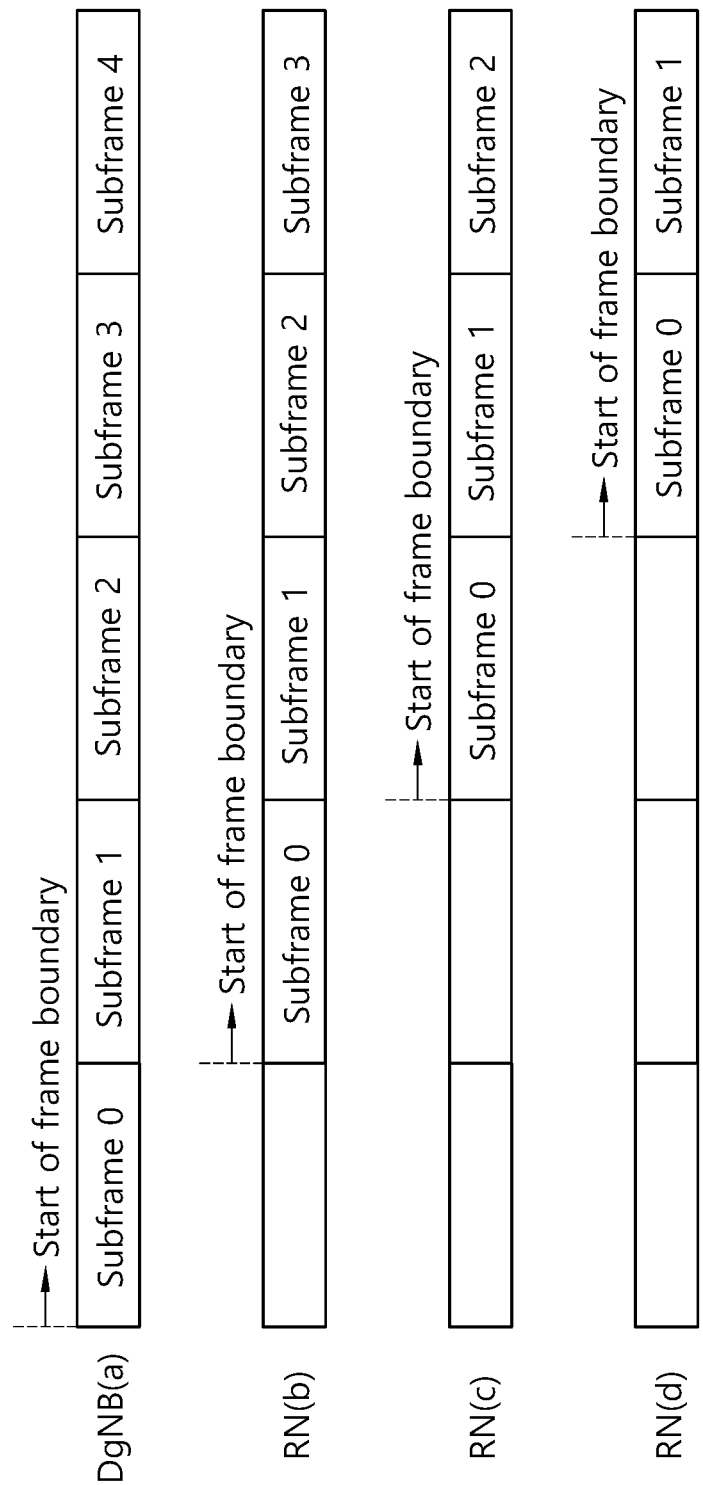
FIG. 15 schematically illustrates subframe offsets for a DgNB and RNs.

FIG. 15 schematically illustrates subframe offsets for a DgNB and RNs.

In FIG. 15, it is assumed that an IAB system includes DgNB(a), RN(b), RN(c), and RN(d). Here, when C_b, C_c, and C_d are 1, 2, and 3, respectively, the frame boundaries of RN(b), RN(c), and RN(d) may respectively have offsets of one, two, and three subframes from the frame boundary of DgNB(a).

In particular, considering that an SSB is transmitted within a window of 5 milliseconds (ms), an offset may be a multiple of 5 ms. For example, $\alpha$ may be five subframes/ms or a multiple of five subframes/ms. Thus, the frame boundary (or system frame boundary) of RN(x) may have an offset of 5*C_x subframes from the frame boundary (or system frame boundary) of the DgNB. Further, considering that a default period for SSB transmission is 20 ms, C_max may be configured to be 20 subframes/ms. Alternatively, $\alpha$ and/or C_max may be configured via system information (SI), RRC, or the like.

[Method B]

A frame boundary offset (or system frame boundary offset) for an RN may vary depending on whether the number of hops from a DgNB to the RN is an odd number or an even number. For example, when the number of hops from the DgNB to the RN is an odd number, the RN may have a frame boundary offset (or system frame boundary offset) of a slots/subframes; when the number of hops from the DgNB to the RN is an even number, the RN may have a frame boundary offset (or system frame boundary offset) of 0 slots/subframes. In this case, when there is a multi-path to each RN, the RN may have a different hop count for each path. In this case, the relay node may perform transmission according to the number of hops in a primary path, the number of hops in the shortest path, the number of hops in the longest path, or the number of hops in a path determined by the DgNB. Here, the primary path may be a path to which the RN is connected, a path to which the RN has established a connection earlier, a path through which the RN monitors a control channel, and/or a path configured as a primary path by a parent node.

In particular, considering that an SSB is transmitted within a window of 5 ms, $\alpha$ may be five subframes/ms or a multiple of five subframes/ms. For example, when the number of hops from the DgNB to the RN is an odd number, the RN may have a frame boundary offset (or system frame boundary offset) of 5 slots/subframes; when the number of hops from the DgNB to the RN is an even number, the RN may have a frame boundary offset (or system frame boundary offset) of 0 slots/subframes. Alternatively, a may be configured via system information (SI), RRC, or the like.

[Method C]

Assuming that there may be K boundary frame offsets (or slot offsets) in total, RNs having the same value obtained by the number of hops from a DgNB to an RN H % K (or mod (H, K)) may use the same offset, and RNs having different values obtained by the number of hops from the DgNB to the RN H % K may use different offsets. For example, when K=3, RNs respectively having one hop and four hops have a different offset from that for RNs respectively having two hops and five hops. When there is a multi-path to each RN, the RN may have a different hop count for each path. In this case, the relay node may perform transmission according to the number of hops in a primary path, the number of hops in the shortest path, the number of hops in the longest path, or the number of hops in a path determined by the DgNB.

When [Method B] or [Method C] is used, it is possible to limit an SS/PBCH block measurement time configuration (SMTC) to two slots/subframes or K slots/subframes.

Next, discovery signal transmission based on a CSI-RS will be described.

This method may be for detecting and/or measuring an IAB node on the basis of a CSI-RS. Specific methods using a CSI-RS are illustrated below.

- Method in which a CSI-RS is configured only for measurement (assuming that a CSI-RS is not used as a discovery signal)
- Method in which a CSI-RS is assumed to be used only as a discovery signal (assuming that a CSI-RS is not used for measurement)
- Method in which a CSI-RS is available as a measurement and discovery signal.

Here, a CSI-RS configuration method may vary according to each method, and the following specific methods may be taken into consideration.

- A method of configuring a dedicated CSI-RS for each pair may be taken into consideration. Each DgNB or RN may configure a dedicated CSI-RS for each of RNs that need to measure the DgNB or RN. This method may be particularly useful for setting different pairs when Tx-Rx beam pairs are different for each pair. When a CSI-RS is configured with respect to a particular beam pair(s) for each pair, if a beam exceeding a threshold is not discovered with respect to a neighboring node on the basis of a CSI-RS, each RN may fall back to measurement using an SSB. This method may be performed only when a fallback is requested. Alternatively, each DgNB/RN may configure a measurement (CSI-RS) relating to a neighboring node for a child node(s) thereof. That is, the DgNB or RN currently performs, for a child RN, an operation similar to an operation of performing radio resource management (RRM) measurement configuration of a CSI-RS for a UE.
- In order to find the best beam pair for each RN, a CSI-RS may also be transmitted by beam sweeping. In this case, a period and an offset used for each DgNB/RN to perform beam sweeping of a CSI-RS, the number of beam sweeping times in each sweeping intervalm and the number of times each beam is repeated (e.g., the number of Tx beam sweeping times*the number of Rx beam sweeping times) may be indicated, thus enabling neighboring nodes to perform measurement according to a transmission period. When this transmission method is used, CSI-RS transmission timing may have a different offset for transmitting a CSI-RS per hop or node using a method similar to a method of shifting a slot/frame/subframe boundary described above in SSB-based discovery signal transmission.

Next, discovery signal transmission based on a CSI-RS will be described.

A method for detecting and/or measuring an IAB node on the basis of a CSI-RS may be taken into consideration. In this case, the following methods may be taken into consideration.

- Method in which a CSI-RS is configured only for measurement (assuming that a CSI-RS is not used as a discovery signal)
- Method in which a CSI-RS is assumed to be used only as a discovery signal (assuming that a CSI-RS is not used for measurement)
- Method in which a CSI-RS is available as a measurement and discovery signal.

Method of configuring a dedicated CSI-RS for each pair

That is, each DgNB or RN may configure a dedicated CSI-RS for each of RNs that need to measure the DgNB or RN. This method may be particularly useful for setting different pairs when Tx-Rx beam pairs are different for each pair. When a CSI-RS is configured with respect to a particular beam pair(s) for each pair, if a beam exceeding a threshold is not discovered with respect to a neighboring node on the basis of a CSI-RS, each RN may fall back to measurement using an SSB. This method may be performed only when a fallback is requested. Alternatively, each DgNB/RN may configure a measurement (CSI-RS) relating to a neighboring node for a child node(s) thereof. That is, the DgNB or RN currently performs, for a child RN, an operation similar to an operation of performing RRM measurement configuration of a CSI-RS for a UE.

Method of transmitting a CSI-RS by beam sweeping in order to find the best beam pair for each RN In this case, a period and an offset used for each DgNB/RN to perform beam sweeping of a CSI-RS, the number of beam sweeping times in each sweeping intervalm and the number of times each beam is repeated (e.g., the number of Tx beam sweeping times*the number of Rx beam sweeping times) may be indicated, thus enabling neighboring nodes to perform measurement according to a transmission period. When this transmission method is used, CSI-RS transmission timing may have a different offset for transmitting a CSI-RS per hop or node using a method similar to a method of shifting a slot/frame/subframe boundary described above in SSB-based discovery signal transmission.

Considering an environment with no or low mobility of a node, a case where a new node occurs among cases where nodes need to discover a neighboring node may be taken into consideration. This case rarely occurs, in which it may be very inefficient to periodically transmit and receive a discovery signal in order to discover a node.

Therefore, it is proposed below that nodes transmit a discovery signal to discover each other when a new RN is connected. That is, it is proposed that nodes aperiodically transmit a discovery signal if needed.

First, a discovery procedure proposed in the disclosure will be described.

When a new node performs initial access to a particular node to establish a connection, nodes may transmit a discovery signal and may discover neighboring nodes through the following process.

a) Discovery Signal Transmission Configuration

A node may receive a configuration about transmission of a discovery signal thereof from a parent node. This configuration may be determined and provided for the child node by the parent node. Alternatively, a DgNB may determine the configuration and may report the configuration to each associated node. In this case, the parent node may forward this configuration, received from the DgNB, to the child node. This configuration may be transmitted via system information (e.g., remaining minimum system information (RMSI) or other system information (OSI)), message 4 (Msg 4), or RRC. Here, message 4 may be a contention resolution message transmitted from a base station to a UE in a random access procedure.

The configuration may include some or all of the following information. Further, through the configuration, the node may receive information about a period, an offset, and duration and may determine discovery signal timing thereof using the received information, a hop count thereof, and path information.

Discovery signal transmission timing information: This information may follow a discovery signal transmission-related configuration specified in a discovery signal configuration for transmission and reception of a discovery signal for detection and measurement described below.

b) Discovery Signal Detection/Measurement Configuration

The node receives a configuration about a discovery signal transmitted by neighboring nodes from the parent node. This configuration may be determined and provided for the child node by the parent node. Alternatively, the DgNB may determine the configuration and may report the configuration to each associated node. In this case, the parent node may forward this configuration, received from the DgNB, to the child node. This configuration may be transmitted via system information (e.g., RMSI or OSI), message 4 (Msg 4), or RRC.

When there is a plurality of nodes transmitting a discovery signal, information about each node may be transmitted. The configuration may include some or all of the following information. Further, through the configuration, the node may receive information about a period, an offset, and duration and may perform detection at the time when the node does not perform transmission on the basis of the received information. In this case, each RN may not accurately identify which node transmits a discovery signal at which time.

Node identification (ID, i.e., cell ID or virtual cell ID)

Discovery signal detection timing information

This information may follow a discovery signal transmission-related configuration specified in a discovery signal configuration for transmission and reception of a discovery signal for detection and measurement described below.

c) Discovery Signal Transmission and Detection Request

The node may receive, from the parent node, a request to transmit a discovery signal and to detect a discovery signal transmitted by neighboring nodes. This request may be determined and configured for the child node by the parent node. Alternatively, the DgNB may determine the request and may report the configuration to each associated node. In this case, the parent node may forward this request, received from the DgNB, to the child node. This request may be transmitted via message 4, RRC, and/or a PDCCH (DCI). Since transmission and reception of a discovery signal needs to be performed by a plurality of nodes together, the request may be transmitted through cell-specific or group-specific RRC or PDCCH (DCI).

This information may follow a discovery signal transmission-related configuration specified in a discovery signal configuration for transmission and reception of a discovery signal for detection and measurement described below.

d) Discovery Signal Transmission and Detection

A UE receiving a request to transmit and detect a discovery signal may transmits a discovery signal thereof using information set according to a discovery signal transmission configuration and may detect a discovery signal transmitted by a neighboring node using information set according to the discovery signal detection configuration.

e) Discovery Signal Detection Feedback

Upon detecting a discovery signal transmitted from neighboring nodes, the node may transmit feedback thereon to the parent node and/or the DgNB. This feedback may include some or all of the following information.

Node ID (i.e., cell ID or virtual cell ID)

Best beam direction index

Result of measuring reference signal received power (RSRP) (or reference signal received quality (RSRQ))

This information may follow a discovery signal transmission-related configuration specified in a discovery signal configuration for transmission and reception of a discovery signal for detection and measurement described below.

Figure 16:
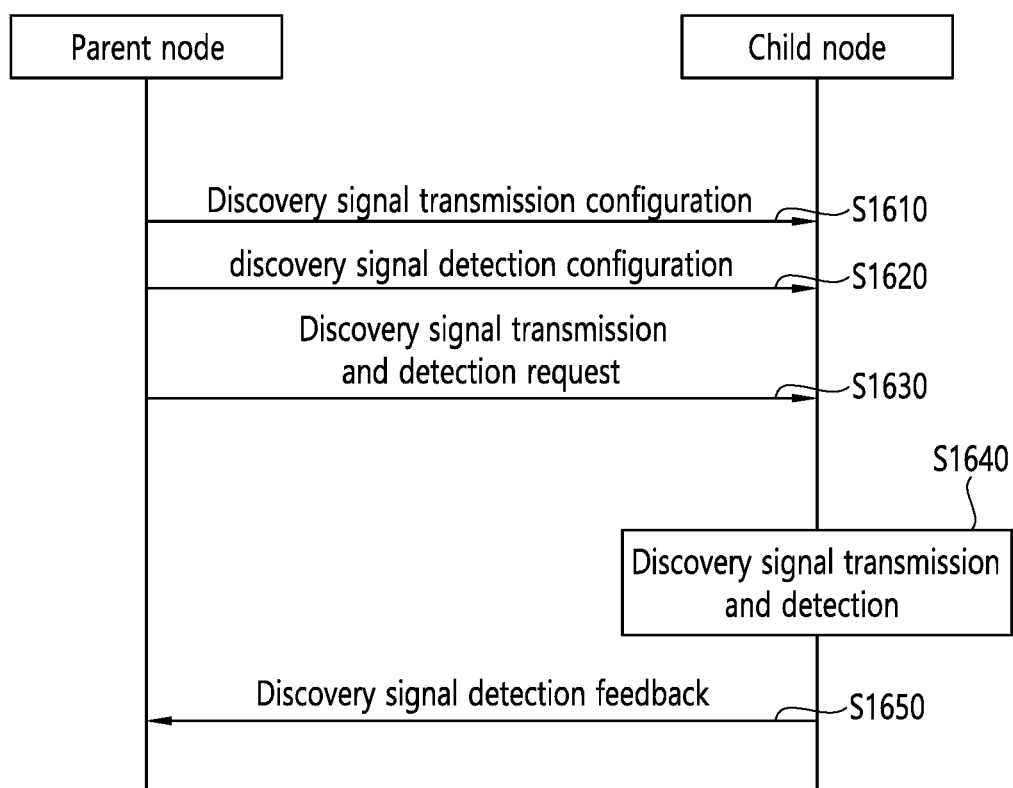
FIG. 16 schematically illustrates a process for discovery signal transmission/reception and feedback.

FIG. 16 schematically illustrates a process for discovery signal transmission/reception and feedback.

Referring to FIG. 16, a parent node transmits a discovery signal transmission configuration and a discovery signal detection configuration to a child node (S1610 and S1620). Although FIG. 16 shows that the configurations are transmitted in two separate steps, the configurations may be transmitted at the same time. Alternatively, the discovery signal transmission configuration and/or the discovery signal detection configuration may not be transmitted in advance but may be transmitted together with a discovery signal transmission and detection request. Further, even though the discovery signal transmission configuration and/or the discovery signal detection configuration are transmitted, the discovery signal transmission configuration and/or the discovery signal detection configuration may be additionally transmitted together with a discovery signal transmission and detection request.

The parent node transmits a discovery signal transmission and detection request to the child node (S1630).

The child node performs discovery signal transmission and detection (S1640).

The child node transmits discovery signal detection feedback to the parent node (S1650). Here, the discovery signal detection feedback may be a signal aperiodically transmitted.

A detailed description of each step in FIG. 16 is the same as described above, and thus a redundant description thereof will be omitted.

Next, discovery signal transmission timing will be described.

Specifically, timing at which a node actually transmit a discovery signal when receiving a discovery signal transmission and detection request and timing at which other nodes are expected to transmit a discovery signal will be described. The discovery signal transmission and detection request may refer to a discovery request in transmission and reception of a discovery signal for detection and measurement, which will be described later. In the following description, a subframe may be replaced with a slot, a mini-slot, or a symbol.

[Method A]

When a node receives a discovery signal transmission and feedback request in subframe n (or slot n), the node may transmit a discovery signal in subframe (or slot) n+K. Here, K may be a value differently set for each node. K may be transmitted via a discovery signal transmission configuration or a different RRC message. K for each node with respect to a discovery signal transmitted by other nodes may be transmitted through a discovery signal detection setting or a different RRC message. Alternatively, K for each node may be a value determined on the basis of the cell ID (or node ID), the number of hops from a DgNB to the node, or the like.

[Method B]

When a node receives a discovery signal transmission and feedback request in subframe n, the node transmits a discovery signal in subframe n+K+K'. Here, a subframe may be replaced with a slot/mini-slot.

K may be a value set equally or differently for each node. K may be specified in the specification or may be transmitted via the request for discovery signal transmission and feedback. Alternatively, K may be a value separately set by RRC or the like.

K' may be a value that is differently set for each node to change the timing of each node transmitting a discovery signal. K' for a particular node with respect to a discovery signal transmitted by the particular node may be transmitted through a discovery signal transmission configuration or a different RRC message. K' for each node with respect to a discovery signal transmitted by other nodes may be transmitted through a discovery signal detection setting or a different RRC message.

Alternatively, K' for each node may be a value determined on the basis of the cell ID (or node ID), the number of hops from a DgNB to the node, an even/odd hop, (hope count) % K, or the like.

FIG. 17 schematically illustrates an example in which discovery signal transmission timing is applied according to the disclosure.

Specifically, (a) of FIG. 17 illustrates an example in which method A for discovery signal transmission timing is applied. Referring to (a) of FIG. 7, a node transmits a discovery signal after K subframes from the time when a discovery signal transmission and detection request is received.

Further, (b) of FIG. 17 illustrates an example in which method B for discovery signal transmission timing is applied. Referring to (b) of FIG. 7, a node transmits a discovery signal after K+K' subframes from the time when a discovery signal transmission and detection request is received.

Although FIG. 17 illustrates an example in which a discovery signal transmission and detection request is received, the foregoing methods may also be applied when a discovery signal transmission and feedback request is received. In addition, since a detailed description of (a) and (b) of FIG. 17 has been made above, a redundant description is omitted.

[Method C]

Although a discovery signal is not periodically transmitted, there may be a period and an offset for transmission of a discovery signal. A position at which a discovery signal can be transmitted may be determined according to this period and offset. A node does not normally transmit a discovery signal but may transmit a discovery signal at the nearest discovery signal transmission timing after subframe n+K when receiving a discovery signal transmission and feedback request in subframe n.

K may be specified in the specification or may be transmitted via the discovery signal transmission and feedback request. Alternatively, K may be a value separately set by RRC or the like.

Figure 18:
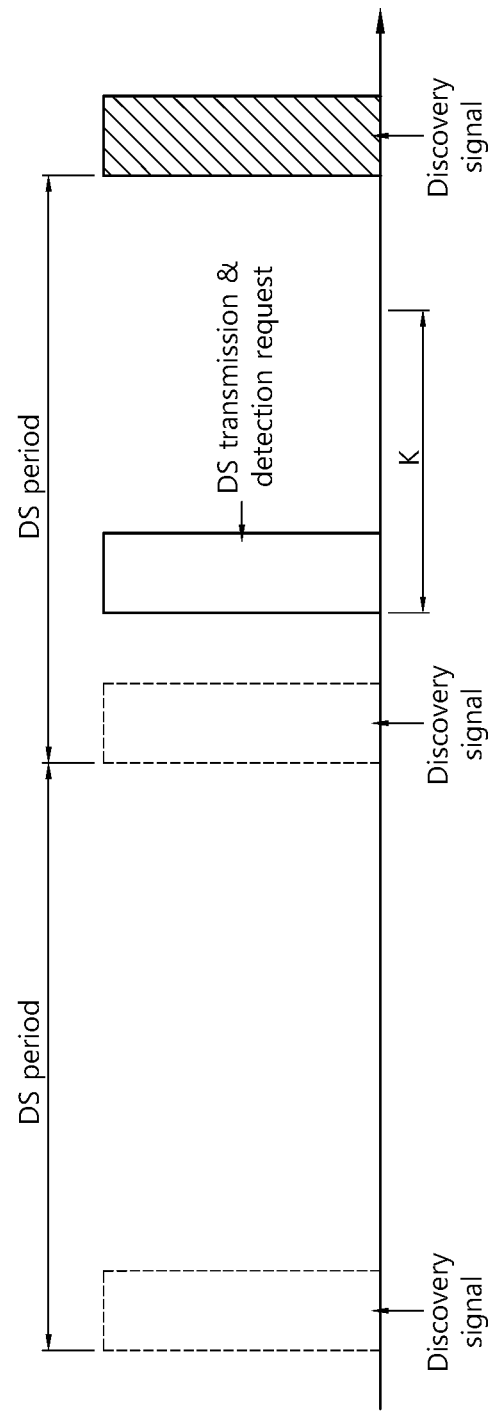
FIG. 18 schematically illustrates another example in which discovery signal transmission timing is applied according to the disclosure.

FIG. 18 schematically illustrates another example in which discovery signal transmission timing is applied according to the disclosure. Specifically, FIG. 18 illustrates an example in which method C for discovery signal transmission timing is applied.

In FIG. 18, the timing at which a discovery signal can be transmitted is indicated in a dotted line. At this timing, a node does not actually transmit a discovery signal. When receiving a discovery signal transmission and feedback request, the node actually transmits a discovery signal at the nearest timing at which a discovery signal can be transmitted after subframe K.

Although FIG. 18 illustrates an example in which a discovery signal transmission and detection request is received, the same method may also be applied when a discovery signal transmission and feedback request is received.

[Method D]

When a node receives a discovery signal transmission and feedback request in subframe n (or slot n), the node may recognize duration for which a discovery signal is transmitted from subframe n+K as an interval during which the discovery signal can be transmitted. Here, K and/or discovery duration may be set through a discovery signal transmission and feedback request message, may be set in advance through RRC, DCI, or the like, or may be defined in the specification. An IAB node may derive the timing at which the IAB node actually transmits a discovery signal within the interval during which the discovery signal can be transmitted. For example, it may be considered to configure the start point of a discovery signal (subframe number (SFN)=i), duration (40 ms), a method for configuring a discovery signal occasion within the duration (e.g., repetition of DDXX (i.e., repetition of two D slots+two X slots, where a D slot may refer to a downlink slot and an X slot may refer to a flexible slot), in which it is assumed that only two slots are used to transmit the discovery signal every four slots from the start point), a method for determining transmission timing for each RN (e.g., transmission timing is determined according to an even-numbered/odd-numbered hop), or the like.

Hereinafter, proposed is transmission and reception of a discovery signal for detection/measurement to enable IAB nodes to recognize each other and to measure the channel condition.

Hereinafter, in the disclosure, a signal that IAB nodes transmit or receive to recognize each other or to detect the best TX-RX beam pair(s) may be referred to as discovery signal A or a detection signal, and a signal for measuring the channel condition with respect to each other may be referred to as discovery signal B or a measurement signal. Here, each of discovery signal A and discovery signal B may be a signal newly defined for the IAB nodes to transmit and receive in order to recognize each other or to detect the best TX-RX beam pair(s). Here, in one example, a discovery signal may be newly defined in a manner of reusing an existing SSB. Further, a discovery signal may also be a backhaul-SSB described above.

Discovery signal A and discovery signal B may be defined to be distinguished from each other or may be defined to be identical to each other. That is, discovery signal A and discovery signal B are defined differently such that discovery signal A may be used for detection of an IAB node, and discovery signal B may be used for measurement. Alternatively, discovery signal A and discovery signal B may be defined as one signal and may be used for both detection and measurement.

Discovery signal A and discovery signal B may have the following characteristics.

First, the characteristics of discovery signal A are described.

Discovery signal A may be a signal transmitted for an IAB node to detect another IAB node and/or a beam direction. Discovery signal A for detecting IAB nodes may be transmitted in all beam directions (i.e., omnidirectionally) or in various beam directions because the location of a node is highly unlikely to be recognized at all or exactly. Further, in an environment where an IAB node has little mobility, a change in the configuration of IAB nodes rarely occurs. Therefore, it is not necessary to frequently perform an IAB node detection process, and thus it is not necessary to frequently transmit discovery signal A.

IAB nodes may not know accurate information about synchronization between each other and may thus need to perform time/frequency synchronization using discovery signal A. Considering the characteristics of the discovery signal, it may be effective to reuse or use an SSB as discovery signal A. As the SSB, an SSB transmitted by each node in an access link may be shared for use.

When synchronization between IAB nodes is achieved to some extent, it may be unnecessary to perform synchronization using discovery signal A. In this case, discovery signal A may have the same form as a CSI-RS, a TRS, a PDSCH, a D2D discovery signal, and the like.

Next, the characteristics of discovery signal B are described.

Discovery signal B is a signal transmitted to measure the continuous channel condition for a significant IAB node and/or a beam direction selected through a detection process. Assuming that an IAB node hardly has mobility, a beam direction for transmission to a particular node does not change. Therefore, the IAB node may perform measurement only in the direction of particular/some beams transmitted to the IAB node, and discovery signal B may also be transmitted only in the direction of particular/some beams in which the IAB node exists. Since the quality of a channel needs to be continuously measured, it is necessary to periodically transmit discovery signal B and to perform measurement. Considering the characteristics of discovery signal B, when a measurement period is so long as to cause significant synchronization deviation, it may be necessary to reuse or use the form of an SSB. When a measurement period is short and thus synchronization deviation does not significantly occur until measurement is performed again, it may be preferable to reuse/use the form of a CSI-RS or another reference signal.

Particularly, discovery signal B may be transmitted via an access link and may be shared with a CSI-RS that a UE transmits via the access link to perform measurement.

The difference between discovery signal A and discovery signal B may be as follows.

Discovery signal A may have a structure of sweeping a transmission beam to be used by each node in a backhaul. In the case of discovery signal B, however, only a subset of a plurality of transmission beams may be transmitted.

Discovery signal A may be transmitted on the basis of broadcast to an unspecified node. Therefore, it may be assumed that when each node needs reception beam sweeping, repetition for reception beam sweeping is performed for each transmission beam.

FDM/SDM/CDM may be taken into consideration in order to reduce overall time to transmit a discovery signal between nodes. TDM between nodes may also be considered. For example, when TDM is performed according to a hop count, resources may be divided by FDM between nodes sharing each hop count. Frequency resources used by each node may be changed over time or may randomly be selected for randomization of an interference level or the like. For example, when discovery signal A is configured on the basis of a CSI-RS, a mapping resource element (mapping RE) may be different for each node, or a CSI-RS transmission frequency region/bandwidth may be set differently. Alternatively, time/frequency resources may be determined according to the node ID, in which the node ID may be assumed to be set by a DgNB.

Considering the characteristics of discovery signal A and discovery signal B described above, a process for detecting and measuring IAB nodes may be performed as follows.

First, a method of transmitting and receiving a discovery signal may be performed as follows.

[Method 1] Simultaneous Detection and Measurement

For example, discovery signal A and discovery signal B may be defined and transmitted as one signal, or discovery signal A and discovery signal B may always be transmitted together. Here, discovery signal A and discovery signal B may be transmitted periodically or aperiodically, and an IAB node detection and measurement process may also be performed periodically or aperiodically.

When a discovery signal is transmitted and received in this manner, a process for detecting and measuring an IAB node through the discovery signal may be performed as follows. Here, all or part of the following process may be included.

(Step 1) Reception of Discovery Signal-Related Configuration

An IAB node needs to know configurations about discovery signal A and discovery signal B required to transmit a discovery signal and to perform detection and measurement using a discovery signal transmitted by other nodes. These configurations may follow details proposed for discovery signal configurations among specific details of a configuration for transmission and reception of a discovery signal to be described later. Here, discovery signal A and discovery signal B may be defined as one signal.

(Step 2) Reception of Discovery Request

When a discovery signal is aperiodically transmitted, the IAB node may receive a discovery request message in order to know the time to transmit a discovery signal and to perform detection and measurement by receiving a discovery signal from other nodes. Even when a discovery signal is periodically transmitted, a discovery request message may be transmitted to indicate the time to start and/or terminate a discovery process. The discovery request message may be received from a parent node. Upon receiving this message, the node may know the time to transmit a discovery signal and/or the time to perform detection and measurement using a discovery signal transmitted by other nodes. Here, details about transmission and reception of a discovery request message and the time to transmit a discovery signal after receiving the discovery request message and to perform detection and measurement of another node may follow details proposed for a discovery request among the specific details of the configuration for transmission and reception of the discovery signal to be described later.

(Step 3) IAB Detection and Measurement

The IAB node transmits a discovery signal that the IAB node needs to transmit and/or performs detection and measurement using a discovery signal transmitted by other nodes at the time determined or set according to (Step 1) and/or (Step 2).

(Step 4) Discovery Feedback

After performing the detection and the measurement, the IAB node feeds back the result to the parent node. The time to transmit feedback information may be defined or may be set in advance. Here, the time at which the IAB node feeds back the detection result and/or the measurement result and information included in the feedback may follow details proposed for discovery feedback among the specific details of the configuration for transmission and reception of the discovery signal to be described later.

[Method 2] Semi-Persistent Measurements

After detecting an IAB node through discovery signal A, a process of measuring a particular IAB node and a beam direction once or periodically a plurality of times may be performed as one set.

Figure 19:
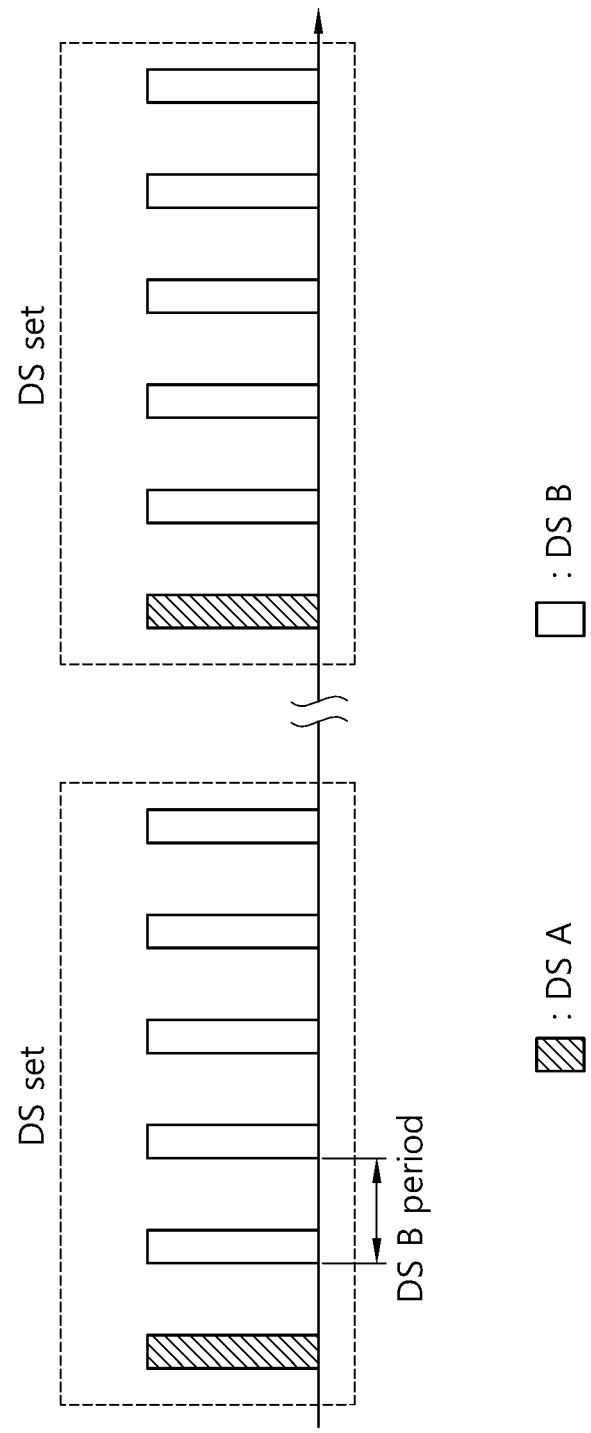
FIG. 19 illustrates a process of discovering and measuring an IAB node through a discovery signal according to the disclosure.

FIG. 19 illustrates a process of discovering and measuring an IAB node through a discovery signal according to the disclosure.

Referring to FIG. 19, discovery signal A is transmitted, and then discovery signal B is sequentially transmitted five times. Here, discovery signal B is transmitted five times with a period of DS B. In addition, discovery signal A and five discovery signals B may be defined as a discovery signal set.

A reception node receiving discovery signal A and discovery signal B may perform detection and measurement operations of discovery signal A and discovery signal B, respectively, and may transmit feedback information about each of the detection and measurement operations to a parent node of the reception node. Here, detection feedback information including the detection result about discovery signal A may be aperiodically transmitted, and measurement feedback information including the measurement result about discovery signal B may be periodically transmitted.

Although FIG. 19 illustrates only an example in which discovery signal B is repeatedly transmitted five times, which is only for illustration, and various discovery signal sets may be configured.

That is, when an IAB node performs a process for discovering another IAB node, as shown in FIG. 19, detection of an IAB node is performed through discovery signal A transmitted first, and then measurement of a selected IAB node(s) and/or beam direction(s) is periodically performed on the basis of the detection result through discovery signal B repeatedly transmitted. Here, in the disclosure, discovery signal A transmitted first and discovery signal B subsequently transmitted are collectively referred to as a discovery signal set, and discovery signal B is periodically transmitted with a period of DS B. The discovery signal set may be transmitted aperiodically or periodically.

When a discovery signal is transmitted and received in this manner, a process for detecting and measuring an IAB node through the discovery signal may be performed as follows. Here, all or part of the following process may be included.

(Step 1) Reception of Discovery Signal A-Related Configuration

An IAB node may need to know configurations required to transmit discovery signal A and to perform detection by receiving discovery signal A transmitted by other nodes. These configurations may follow the details proposed for the discovery signal configurations among the specific details of the configuration for transmission and reception of the discovery signal to be described later.

(Step 2) Reception of Discovery Signal B-Related Configuration

An IAB node may need to know configurations required to transmit discovery signal B and to perform measurement by receiving discovery signal B transmitted by other nodes. These configurations may follow the details proposed for the discovery signal configurations among the specific details of the configuration for transmission and reception of the discovery signal to be described later.

In the disclosure, these configurations may be set together with the discovery signal A-related configurations proposed above in (Step 1).

(Step 3) Reception of Discovery Request

When a discovery signal set is aperiodically transmitted, a discovery request message may be transmitted in order to indicate the time to transmit a discovery signal set and the time to perform detection and measurement of other nodes. That is, the IAB node may receive the discovery request message from a parent node, and may know the time to transmit discovery signal A and/or the time to perform IAB node detection by receiving discovery signal A from other nodes upon receiving the message. Here, details about transmission and reception of a discovery request message and the time to transmit discovery signal A after receiving the discovery request message and to perform detection of another node may follow details proposed for a discovery request among the specific details of the configuration for transmission and reception of the discovery signal to be described later.

(Step 4) IAB Detection

The IAB node may transmit discovery signal A that the IAB node needs to transmit and/or may perform IAB node detection using discovery signal A transmitted by other nodes at the time determined or set according to (Step 1) and/or (Step 3).

(Step 5) IAB Detection Feedback

After performing the detection, the IAB node feeds back the result to the parent node. The time to transmit feedback information may be defined or may be set in advance. Here, the time at which the IAB node feeds back the detection result and information included in the feedback may follow details proposed for discovery feedback among the specific details of the configuration for transmission and reception of the discovery signal to be described later.

(Step 6) Reception of Discovery Signal B-Related Configuration and IAB Measurement After feeding back the result of the detection using discovery signal A, the IAB node may receive, from the parent node, a transmission-related configuration of discovery signal B, and/or a node and a beam direction to be subjected to IAB node measurement, and/or a timing-related configuration. These configurations may follow the details proposed for the discovery signal configurations among the specific details of the configuration for transmission and reception of the discovery signal to be described later. This step of receiving the discovery signal B-related configuration (Step 6) may be an additional step.

(Step 7) IAB Measurement

The IAB node may transmit discovery signal B that the IAB node needs to transmit and/or may perform IAB node measurement using discovery signal B transmitted by other nodes at the time determined or set according to (Step 2) and/or (Step 6).

(Step 8) IAB Measurement Feedback

After performing the measurement, the IAB node feeds back the result to the parent node. The time to transmit feedback information may be defined or may be set in advance. Here, the time at which the IAB node feeds back the measurement result and information included in the feedback may follow details proposed for discovery feedback among the specific details of the configuration for transmission and reception of the discovery signal to be described later.

[Method 3] Periodic Detection and Measurement According to Different Periods

IAB node detection using discovery signal A and IAB node measurement using discovery signal B may be periodically performed, but with different periods. That is, transmission of discovery signal A and/or IAB node detection may be performed with a discovery signal A period, and transmission of discovery signal B and/or IAB node measurement may be performed with a discovery signal B period. Here, the discovery signal A period may be set to be greater than the discovery signal B period.

When a discovery signal is transmitted and received in this manner, a process for detecting and measuring an IAB node through the discovery signal may be performed as follows. Here, all or part of the following process may be included.

(Step 1) Reception of Discovery Signal A-Related Configuration

An IAB node needs to know configurations required to transmit discovery signal A and to perform detection by receiving discovery signal A transmitted by other nodes. These configurations may follow the details proposed for the discovery signal configurations among the specific details of the configuration for transmission and reception of the discovery signal to be described later.

(Step 2) Reception of Discovery Signal B-Related Configuration

An IAB node needs to know configurations required to transmit discovery signal B and to perform measurement by receiving discovery signal B transmitted by other nodes. These configurations may follow the details proposed for the discovery signal configurations among the specific details of the configuration for transmission and reception of the discovery signal to be described later. In the disclosure, these configurations may be set together with the discovery signal A-related configurations proposed above in (Step 1).

(Step 3) Reception of Discovery Request

When a discovery signal is periodically transmitted, a discovery request message may also be transmitted for the IAB node to know the time to actually start a discovery process and/or the time to terminate the discovery process. That is, the IAB node may receive the discovery request message from a parent node, and may know the time to start and/or terminate transmission of a discovery signal and the time to perform IAB node detection and measurement by receiving a discovery signal from other nodes upon receiving the message. Here, details about transmission and reception of a discovery request message and the time to transmit a discovery signal after receiving the discovery request message and to perform detection and measurement of another node may follow details proposed for a discovery request message among the specific details of the configuration for transmission and reception of the discovery signal to be described later.

(Step 4) IAB Detection

The IAB node may transmit discovery signal A that the IAB node needs to transmit and/or may perform IAB node detection using discovery signal A transmitted by other nodes at the time determined or set according to (Step 1).

(Step 5) IAB Detection Feedback

After performing the detection, the IAB node feeds back the result to the parent node. The time to transmit feedback information may be defined or may be set in advance. Here, the time at which the IAB node feeds back the detection result and information included in the feedback may follow details proposed for discovery feedback among the specific details of the configuration for transmission and reception of the discovery signal to be described later.

(Step 6) Reception of Discovery Signal B-Related Configuration

After feeding back the result of the detection using discovery signal A, the IAB node may receive, from the parent node, a transmission-related configuration of discovery signal B, and/or a node and a beam direction to be subjected to IAB node measurement, and/or a timing-related configuration. These configurations may follow the details proposed for the discovery signal configurations among the specific details of the configuration for transmission and reception of the discovery signal to be described later. This step may be an additional step.

(Step 7) IAB Measurement

The IAB node may transmit discovery signal B that the IAB node needs to transmit and/or may perform IAB node measurement using discovery signal B transmitted by other nodes at the time determined or set according to (Step 2) and/or (Step 5).

(Step 8) IAB Measurement Feedback

After performing the measurement, the IAB node feeds back the result to the parent node. The time to transmit feedback information may be defined or may be set in advance. Here, the time at which the IAB node feeds back the measurement result and information included in the feedback may follow details proposed for discovery feedback among the specific details of the configuration for transmission and reception of the discovery signal to be described later.

[Method 4] Aperiodic Detection and Periodic Measurement

Since an IAB node may generally have the characteristics of a static node, the IAB node may be relatively rarely detected via discovery signal A. Further, an SSB of NR has relatively larger signal overhead than a synchronization signal of LTE. Thus, for example, when an NR SSB is reused for discovery signal A and detection of an IAB node through discovery signal A is periodically performed, inefficiency in using resources, power, or the like may be incurred. Furthermore, in a high-frequency band, detection in all beam directions may result in excessive overhead.

Therefore, IAB node detection using discovery signal A may be performed aperiodically and intermittently, while IAB measurement using discovery signal B, which needs not to be continuously performed, may be performed periodically. That is, when the IAB node discovers another IAB node, the IAB node may aperiodically and intermittently perform IAB node detection using discovery signal A and may then periodically perform, using discovery signal B repeatedly transmitted, measurement of an IAB node(s) and/or beam direction(s) selected on the basis of the detection result.

When a discovery signal is transmitted and received in this manner, a process for detecting and measuring an IAB node through the discovery signal may be performed as follows. Here, all or part of the following process may be included.

(Step 1) Reception of Discovery Signal A-Related Configuration

An IAB node needs to know configurations required to transmit discovery signal A and to perform detection by receiving discovery signal A transmitted by other nodes. These configurations may follow the details proposed for the discovery signal configurations among the specific details of the configuration for transmission and reception of the discovery signal to be described later.

(Step 2) Reception of Discovery Signal B-Related Configuration

An IAB node needs to know configurations required to transmit discovery signal B and to perform measurement by receiving discovery signal B transmitted by other nodes. These configurations may follow the details proposed for the discovery signal configurations among the specific details of the configuration for transmission and reception of the discovery signal to be described later. In the disclosure, these configurations may be set together with the discovery signal A-related configurations proposed above in (Step 1).

(Step 3) Reception of Discovery Request

When discovery signal A is periodically transmitted, a discovery request message may be transmitted for the IAB node to know the time to transmit discovery signal A and to perform detection of other nodes. That is, the IAB node may receive the discovery request message from a parent node, and may know the time to transmit discovery signal A and/or the time to perform IAB node detection by receiving discovery signal A from other nodes upon receiving the message. Here, details about transmission and reception of a discovery request message and the time to transmit discovery signal A after receiving the discovery request message and to perform detection of another node may follow details proposed for a discovery request among the specific details of the configuration for transmission and reception of the discovery signal to be described later.

(Step 4) IAB Detection

The IAB node may transmit discovery signal A that the IAB node needs to transmit and/or may perform IAB node detection using discovery signal A transmitted by other nodes at the time determined or set according to (Step 1) and/or (Step 3).

(Step 5) IAB Detection Feedback

After performing the detection, the IAB node feeds back the result to the parent node. The time to transmit feedback information may be defined or may be set in advance. Here, the time at which the IAB node feeds back the detection result and information included in the feedback may follow details proposed for discovery feedback among the specific details of the configuration for transmission and reception of the discovery signal to be described later.

(Step 6) Reception of Discovery Signal B-Related Configuration

After feeding back the result of the detection using discovery signal A, the IAB node may receive, from the parent node, a transmission-related configuration of discovery signal B, and/or a node and a beam direction to be subjected to IAB node measurement, and/or a timing-related configuration. These configurations may follow the details proposed for the discovery signal configurations among the specific details of the configuration for transmission and reception of the discovery signal to be described later.

(Step 7) IAB Measurement

The IAB node may transmit discovery signal B that the IAB node needs to transmit and/or may perform IAB node measurement using discovery signal B transmitted by other nodes at the time determined or set according to (Step 2) and/or (Step 5).

(Step 8) IAB Measurement Feedback

After performing the measurement, the IAB node feeds back the result to the parent node. The time to transmit feedback information may be defined or may be set in advance. Here, the time at which the IAB node feeds back the measurement result and information included in the feedback may follow details proposed for discovery feedback among the specific details of the configuration for transmission and reception of the discovery signal to be described later.

Figure 20:
FIG. 20 schematically illustrates an example of a method for aperiodic detection and periodic measurement of an IAB node according to the disclosure.

FIG. 20 schematically illustrates an example of a method for aperiodic detection and periodic measurement of an IAB node according to the disclosure.

Referring to FIG. 20, discovery signal B is periodically transmitted with a discovery signal B period, and discovery signal A is aperiodically transmitted.

As described above, [Method 4] may be applied as a method for aperiodic detection and periodic measurement of an IAB node. Since a detailed description of the method has been described above, a redundant description is omitted.

A node may receive a configuration about whether transmission and detection of discovery signal A is performed periodically or aperiodically. Furthermore, as described above, since detection in all beam directions may cause excessive overhead to an IAB node, detection may be performed only in specific beam directions depending on the configuration. This configuration may be transmitted via system information or RRC.

Particularly, both periodic detection and aperiodic detection may be performed. That is, periodic detection and aperiodic detection may be performed in parallel. In this case, a discovery signal A configuration for periodic detection and a discovery signal A configuration for aperiodic detection may be set separately.

Alternatively, a plurality of discovery signal A configurations may be set, each of which may be a configuration for periodic detection or a configuration for aperiodic detection. When a plurality of discovery signal A configurations is set for periodic detection, a detection period and/or a detection offset may vary.

In the foregoing description, a detection operation may be construed as being replaced with an operation of transmitting discovery signal A. The foregoing description may also be applied to transmission and measurement of discovery signal A.

Hereinafter, a configuration for transmission and reception of a discovery signal will be described in detail.

First, discovery signal configurations among details of the configuration for the transmission and reception of the discovery signal will be described.

A parent node may determine configurations related to transmission of a discovery signal and detection/measurement using the discovery signal for a child node. Alternatively, a DgNB may determine and report these configurations each node associated therewith. In this case, the parent node may forward configuration information, received from the DgNB, to the child node. In addition, a configuration associated with transmission of discovery signal A (discovery signal A configuration) may be transmitted semi-statically through RRC, system information, or the like.

The discovery signal A configuration may include the following information.

- Periodic or aperiodic detection: It may be set whether to periodically or aperiodically perform transmission of discovery signal A and IAB detection.
- Discovery signal A transmission period: When discovery signal A is periodically transmitted, an IAB node may receive a period of discovery signal A that the IAB node transmits.
- Discovery signal A transmission offset: There may be a timing offset between discovery signals A transmitted by different IAB nodes in order to efficiently utilize resources or to reduce interference in transmission of discovery signal A between IAB nodes. This offset may be determined according to an IAB node ID, a hop level (i.e., the number of hops from a donor node), information about a path from the donor node, and/or a specific value (e.g., $\alpha$) set by the parent node (to distinguish nodes in the same hop level). Accordingly, the IAB node may receive a set offset value for discovery signal A that the IAB node transmits or a set value (e.g., $\alpha$) necessary to determine the offset value for discovery signal A.

Discovery signal A beam direction list: When transmitting discovery signal A, the IAB node may transmit discovery signal A only in a beam direction in which an IAB node may exist. For example, when recognizing that other IAB nodes are not located at a lower position, the IAB node may transmit discovery signal A in a direction other than the direction of the position. Accordingly, the direction of a transmission beam used for transmission of discovery signal A may be limited to some directions, thereby reducing the overhead of the IAB node for discovery signal A transmission. To this end, a transmission beam direction(s) used for transmission of another discovery signal A may be set.

IAB detection period: When the IAB node periodically detects discovery signal A, a discovery signal A detection period may be set. In particular, the period may always be the same as a discovery signal A transmission period with which the IAB node transmits discovery signal A. Alternatively, the IAB node may have a plurality of (e.g., two) discovery signal A detection periods. In this case, IAB node detection may be performed at both the time determined according to a first period and the time determined according to a second period.

IAB detection duration: This information indicates duration during which the IAB node attempts IAB detection. The length of the duration may be defined in the specification or may be set by the parent node. Particularly, when set, the duration may be set for each IAB detection period. Here, it may be assumed that the IAB node performs detection at the time when the IAB node does not transmit a discovery signal in an IAB detection interval. In this case, each RN may not accurately know which node transmits a discovery signal at which time in the IAB detection interval.

IAB detection node list: To help the IAB node in detecting a neighboring IAB node, cell ID (or node ID) information of the neighboring IAB node may be provided. That is, the cell ID (or node ID) of an IAB node (s) that the IAB node needs to detect may be set. In this case, the IAB node is required to detect only IAB nodes included in the IAB node list. Alternatively, even though an IAB node list is set, IAB nodes to be detected by the IAB node may not be limited to IAB nodes in the set list. In particular, when there is a plurality of discovery signal A detection periods, an IAB node list may be set for each discovery signal A detection period. That is, it is possible to know which discovery signal A detection period each IAB node included in the IAB node list has.

Reception beam list: The direction of a reception beam used for the IAB node to detect another IAB node may be limited to some reception beam directions, thereby reducing the overhead of the IAB node for detection. To this end, a reception beam direction(s) used for detection of another node may be set.

A configuration associated with transmission of discovery signal B (discovery signal B configuration) may also be transmitted semi-statically through RRC, system information, or the like. The discovery signal B configuration may include the following information.

Discovery signal B transmission period: When discovery signal B is periodically transmitted, an IAB node may receive a period of discovery signal B that the IAB node transmits.

Discovery signal B transmission offset: There may be a timing offset between discovery signals B transmitted by different IAB nodes in order to efficiently utilize resources or to reduce interference in transmission of discovery signal B between IAB nodes. This offset may be set to the index of a slot/index of a subframe in which discovery signal B is transmitted. This offset may be determined according to an IAB node ID, a hop level (i.e., the number of hops from a donor node), information about a path from the donor node, and/or a specific value (e.g., β) set by the parent node (to distinguish nodes in the same hop level). Accordingly, the IAB node may receive a set offset value for discovery signal B that the IAB node transmits or a set value (e.g., β) necessary to determine the offset value for discovery signal B.

Discovery signal B transmission resource index: For example, when discovery signal B is a type such as a CSI-RS, discovery signal B may be transmitted through one resource or a plurality of resources among a plurality of resources for transmitting discovery signal B. In this case, index information indicating the position of a resource through which the IAB node transmits discovery signal B may be set.

Discovery signal B beam direction index: An analog beam direction index and/or a precoding index for which the IAB node transmits discovery signal B may be set. In this case, the analog beam direction index and/or the precoding index may be set for each discovery signal B transmission resource index.

IAB measurement period: When the IAB node periodically performs measurement using discovery signal B, a discovery signal B measurement period may be set. In particular, the period may always be the same as a discovery signal B transmission period with which the IAB node transmits discovery signal B. Alternatively, the IAB node may have a plurality of (e.g., two) discovery signal B measurement periods. In this case, IAB node measurement may be performed at both the time determined according to a first period and the time determined according to a second period.

IAB measurement duration: This information may indicate duration during which the IAB node performs IAB measurement. The length of the duration may be defined in the specification or may be set by the parent node. Particularly, when set, the IAB measurement duration may be set for each IAB measurement period. Here, it may be assumed that the IAB node performs measurement at the time when the IAB node does not transmit a discovery signal in an IAB measurement interval. In this case, each RN may not accurately know which node transmits a discovery signal at which time in the IAB measurement interval.

IAB measurement list: The IAB node may perform measurement using discovery signals B transmitted by a plurality of IAB nodes. Further, the IAB node may perform measurement on a plurality of discovery signal B resources transmitted by one IAB node. Here, the following information may be set for each discovery signal B resource (IAB measurement resource) on which the IAB node needs to perform measurement.

Cell ID (or node ID)

IAB measurement period

IAB measurement offset: Timing offset for which the IAB node performs measurement Discovery signal B resource index Characteristically, as described above, instead of setting a measurement period for each resource for which the IAB node performs measurement, a discovery signal B resource belonging to a specific measurement period may be defined.

Characteristically, the discovery signal B configuration may be set in two steps. As in [Method B] to [Method D] for the method for transmitting and receiving the discovery signal, some information may be set in advance, and some information may be additionally set after performing IAB node detection and feeding back the result, because an IAB node and a beam direction for measurement may vary depending on the detection result.

When detection/measurement of an IAB node is periodically performed, detection/measurement of an IAB node may be performed without any request message after receiving a discovery signal configuration. In this case, the detection/measurement of the IAB node may be performed using a discovery signal transmitted after receiving the discovery signal configuration.

This configuration may be for setting the timing at which each DgNB/RN starts transmitting a discovery signal, during, a set of discovery signal transmission occasions within that duration, and/or a method for each RN to determine a discovery signal occasion. For example, it may be considered to configure the start point of a discovery signal (SFN=i), duration (40 ms), a method for configuring a discovery signal occasion within the duration (e.g., repetition of DDXX (i.e., repetition of two D slots+two X slots), in which it is assumed that only two slots are used to transmit the discovery signal every four slots from the start point), a method for determining discovery signal transmission timing for each RN (e.g., transmission timing is determined according to an even-numbered/odd-numbered hop), or the like.

Characteristically, the IAB node may receive a plurality of discovery signal configurations as described above. For example, the IAB node may receive one or a plurality of configuration sets for transmission of a discovery signal and may receive one or a plurality of configuration sets for detection/measurement through the discovery signal. Alternatively, the IAB node receives one or a plurality of configuration sets for transmission of discovery signal A and/or one or a plurality of configuration sets for transmission of discovery signal B and may receive one or a plurality of configuration sets for IAB node detection and/or one or a plurality of configuration sets for IAB node measurement. In this case, a procedure for transmission and detection/measurement of a discovery signal may be aperiodically triggered according to a dynamic request. Here, when an aperiodic request (by discovery request message) is made, one of the plurality of configuration sets received in advance may be selectively requested. That is, a plurality of discovery operations, such as a full discovery mode in which transmission is performed with all transmission beams and a partial discovery mode in which transmission is performed only with beams associated with a child node, may be configured according to a change in network topology, one among which may be selectively designated.

Hereinafter, a discovery request among the details of the configuration for the transmission and reception of the discovery signal will be described.

When a discovery signal is transmitted periodically or aperiodically, a discovery request message may be transmitted to request detection and/or measurement using the discovery signal. Here, when the discovery request message is used, when an IAB node may perform IAB node detection and/measurement using the discovery signal upon receiving the discovery request message.

This request may be determined by a parent node and may be configured for a child node. Alternatively, a DgNB may determine and report these configurations to each node associated therewith. In this case, the parent node may forward this request information received from the DgNB to the child node. This request may be transmitted via message 4 (Msg 4), RRC, and/or a PDCCH (DCI). Since transmission and reception of a discovery signal needs to be performed by a plurality of nodes together, this request may be transmitted through cell-specific or group-specific RRC or PDCCH (DCI). Alternatively, this request may be transmitted to an RN associated with the DgNB via RRC through each path.

When a discovery signal is aperiodically transmitted, the time at which the IAB node transmits a discovery signal and performs detection and/or measurement after receiving a discovery request message may be as follows.

When the IAB node receives a discovery request in subframe n (or slot n), the node may transmit a discovery signal in subframe n+K (or slot n+K). K may be defined as a specific value in the specification or may be a value set by the parent node. Characteristically, defining a discovery signal A transmission offset for node x as $K'\_x$, when the IAB node receives a discovery request in subframe n (or slot n), the node may transmit discovery signal A in subframe $n+K+K'\_n$ (or slot $n+K+K'\_n$). Alternatively, when the IAB node receives a discovery request in subframe n (or slot n), the node performs detection for IAB detection duration from subframe n+K (or slot n+K). This description may be applied not only to a case of performing IAB detection with discovery signal A but also to a case of performing IAB measurement with discovery signal B.

Although a discovery signal is actually aperiodically transmitted, there may be a period and an offset for transmission of a discovery signal. A position at which a discovery signal can be transmitted may be determined according to this period and offset A node does not normally transmit a discovery signal but may transmit a discovery signal at the nearest discovery signal transmission timing after subframe n+K (or slot n+K) when receiving a discovery request in subframe n (or slot n). Further, although a discovery signal is actually aperiodically transmitted, a time region for transmitting detection with discovery signal A may be determined according to an IAB detection period. In this case, when the IAB node receives a discovery request in subframe n (or slot n), the node may perform detection for IAB detection duration at the nearest time for performing IAB detection after subframe n+K (or slot n+K).

This description may be applied not only to a case of performing IAB detection with discovery signal A but also to a case of performing IAB measurement with discovery signal B.

When a discovery signal is periodically transmitted, the time at which the IAB node first transmits a discovery signal and performs detection and/or measurement after receiving a discovery request message may be as follows.

When receiving a discovery request in subframe n (or slot n), the node may transmit discovery signal A at a discovery signal A transmission time according to a transmission period and an offset for discovery signal A after subframe n+K (or slot n+K). Further, when a discovery signal is periodically transmitted and thus IAB detection is periodically performed, if the IAB node receives a discovery request in subframe n (or slot n), the node may perform IAB detection according to an IAB detection period and duration after subframe n+K (or slot n+K).

This description may be applied not only to a case of performing IAB detection with discovery signal A but also to a case of performing IAB measurement with discovery signal B.

When a discovery request message is transmitted, all or some information of the foregoing discovery signal configurations may be included and transmitted.

Characteristically, when a discovery request message is transmitted, it may be configured whether the node performs only transmission of discovery signal A without detection, performs detection only without transmission of discovery signal A, or performs both transmission of discovery signal A and detection. Depending on this configuration, the node may only transmit discovery signal A without detecting a neighboring node, may only detect a neighboring node without transmitting discovery signal A, or may perform both transmission of discovery signal A and detection. This description may equally be applied to transmission of discovery signal B and measurement.

Hereinafter, discovery feedback among the details of the configuration for the transmission and reception of the discovery signal will be described.

After performing IAB detection using discovery signal A, the IAB node performs IAB detection feedback of feeding back the detection result to the parent node or the DgNB. The feedback may be transmitted via a PUCCH and/or a PUSCH. Here, feedback information may include the following details.

Detected IAB node ID and beam ID: The ID of an IAB node successfully detected by the IAB node and/or a beam ID are transmitted. Here, the beam ID may refer to the index of an SS/PBCH block. The number of IAB nodes or the number of {IAB node ID, beam ID} sets fed back by the IAB node may be limited to up to N. When the number of IAB nodes detected by the IAB node is greater than N, the IAB node may feed back information about N LAB nodes having the best N detection performance (e.g., received power, RSRP, or the like).

After performing IAB measurement using discovery signal B, the IAB node may feed back the measurement result to the parent node or the DgNB. The feedback may be transmitted via a PUCCH and/or a PUSCH. Feedback information may include the following details.

Measurement result per IAB node ID and beam ID: The IAB node may measure each IAB node or {IAB node ID, beam ID} set and may transmit feedback thereon. Here, RSRP, RSRQ, and/or a received signal strength indicator (RSSI) may be measured.

As in [Method A] for the method for transmitting and receiving the discovery signal, when discovery signal A and discovery signal B are defined as one discovery signal, the IAB node may include information about a detected IAB node ID and a beam ID and information about a measurement result per IAB node and beam ID together.

Hereinafter, a discovery signal transmission scenario will be described.

Specifically, proposed below are a scenario in which IAB nodes transmit a discovery signal and perform detection and measurement using the discovery signal and a method for transmitting and receiving a discovery signal in the scenario.

First, the types of neighboring nodes are defined from the perspective of one node.

Detected node: After anode establishes a connection to a specific node, the node may discover near nodes by performing a detection process. Nodes detected using a detection signal may be referred to as neighboring nodes.

Measurement node: Among detected nodes, nodes determined to have a good channel condition and thus selected to be subjected to continuous measurement may be referred to as measurement nodes. In particular, all detected nodes may be measurement nodes. A node may select a measurement node from among the detected nodes on the basis of a specified criterion and may report the measurement node to a parent node. Alternatively, the node may report the detected nodes to the parent node, and the parent node may set a measurement node to be measured. The node may periodically or aperiodically measure measurement nodes thereof and may report the measurement result to the parent node.

Parent node: A node may select a node to be a new parent node among measurement nodes thereof and may establish a connection therewith. In some cases, the node may select a node to be a new parent node directly from among detected nodes and may establish a connection therewith.

First, a scenario in which a node discovers a new node in the presence of a connected parent node may be illustrated below.

When a new node occurs: When a new node occurs and thus the node establishes a connection with a different node through an initial access process, the node also needs to detect neighboring nodes, and existing nodes need to detect the new node. This detection process is performed when a new node occurs, and is thus rarely performed. Therefore, detection may be aperiodically performed. When a new node occurs and a connection is established, this information may be reported to a DgNB. Then, the DgNB may trigger nodes to transmit a discovery signal and to perform detection.

When a node to be measured is changed: When the channel quality of nodes that the node measures is poor due to a change in channel environment, it is necessary to configure new measurement nodes. In this case, a measurement node may be newly configured or changed by performing new detection. When a detection process is performed aperiodically, if the node determines that it is necessary to change measurement nodes thereof, the node or the parent node thereof may transmit a request that a detection process is necessary to the DgNB. Upon receiving the request, the DgNB may trigger nodes to transmit a discovery signal and to perform detection. In this case, characteristically, 1) nodes receiving a triggering message may perform both transmission of a detection signal and detection. Alternatively, in this case, characteristically, 2) transmission of a detection signal and detection may be separately set through a triggering message. Here, a node set to perform only detection may perform only detection without transmitting a detection signal, and a node set to perform only transmission of a detection signal may only transmit a detection signal without detecting other nodes. Further, when both transmission of a detection signal and detection are set, a node may perform both transmission of a detection signal and detection. With this method, a node that needs to change measurement nodes and thus transmits a detection request to the DgNB may perform only detection, while other nodes that do not need to change measurement nodes may only transmit a detection signal.

When a detection process is periodically performed, a node may periodically perform a detection process to change a measurement node set thereof.

When there is a mobile node or when a node is a wireless node: When a neighboring node is a wireless node or when a node is a wireless node, a node continuously existing nearby may be changed. In this case, a measurement node may be newly configured or changed by periodically performing detection. Therefore, a detection procedure may be performed periodically for this case. Alternatively, the DgNB may set whether to perform detection aperiodically or periodically through system information or RRC.

Next, an operation in a situation where a node disconnected from a parent node discovers a new node in order to connect to a new parent node may be illustrated below.

In this case, the node may perform a new initial access procedure to search for a new parent node and to establish a connection to the new parent node.

When there is a measurement node that the node measures before disconnected from the previous parent node, the node may select one of measurement nodes and may establish a connection thereto.

When periodic detection is set, the node may establish a connection to a node detected by performing detection at a detection time.

When aperiodic detection is set, if a specific node and a parent node are disconnected, the parent node detecting the disconnection may report the disconnection to the DgNB. Then, the DgNB may trigger neighboring nodes to transmit a detection signal. This transmission of a detection signal may be performed once or periodically for a specified time period. The node disconnected from the parent node may attempt detection, expecting other nodes to transmit a detection signal. This detection may be performed aperiodically or periodically through a predetermined resource.

Figure 21:
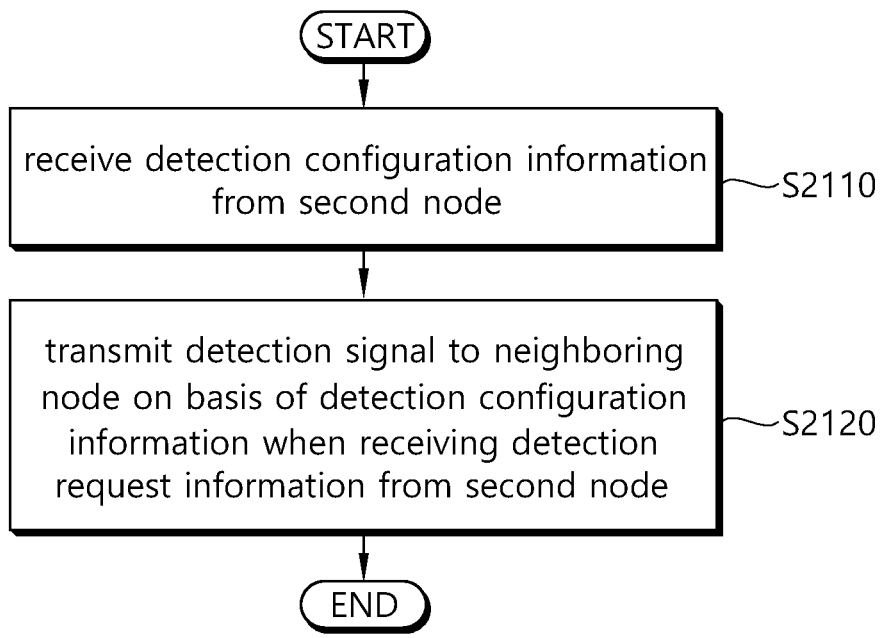
FIG. 21 is a flowchart illustrating a detection method performed by a first node according to an embodiment of the disclosure.

FIG. 21 is a flowchart illustrating a detection method performed by a first node according to an embodiment of the disclosure.

Referring to FIG. 21, the first node receives detection configuration information from a second node (S2110).

When receiving detection request information from the second node, the first node transmits a detection signal to a neighboring node on the basis of the detection configuration information (S2120). Here, the detection signal may be transmitted aperiodically. In addition, the detection signal may be transmitted on the basis of beam sweeping. The detection signal may be different from a synchronization signal block (SSB) transmitted by the first node to a UE. Specifically, the detection signal may be different from the SSB in at least one of transmission timing, a transmission period, and resource allocation.

Figure 22:
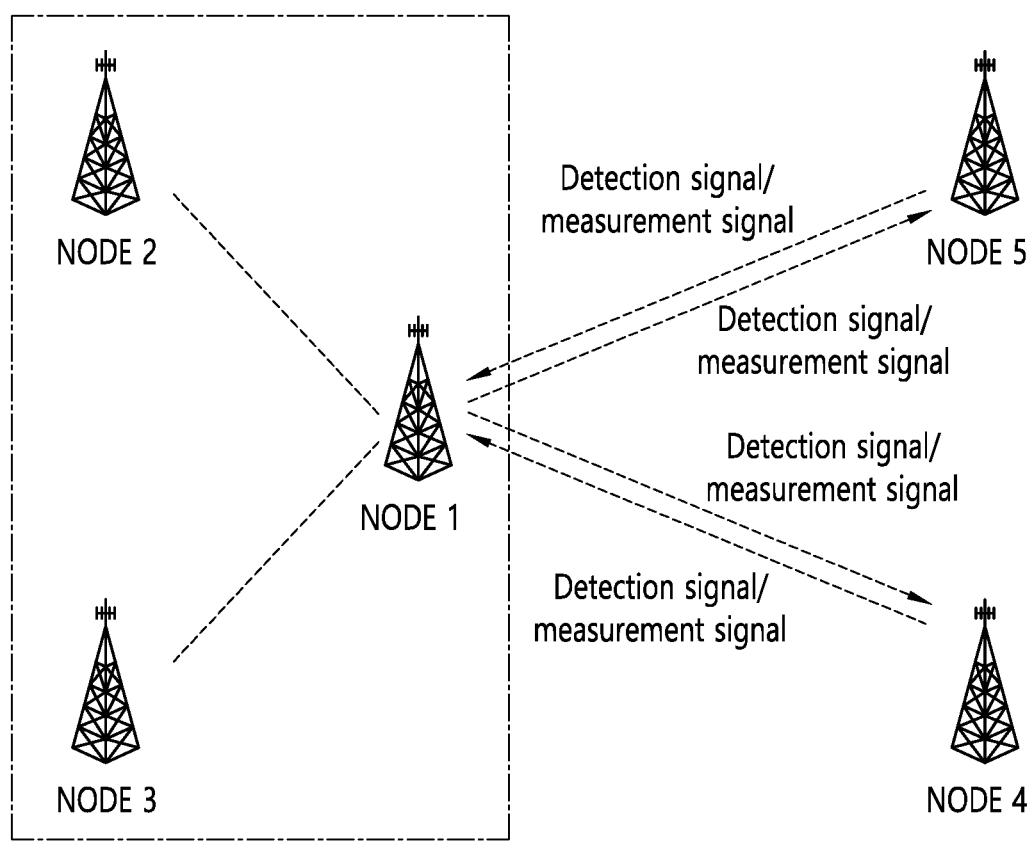
FIG. 22 schematically shows an example to which the disclosure is applied.

FIG. 22 schematically shows an example to which the disclosure is applied.

FIG. 22 illustrates an example in which node 1 detects and/or measures node 4 and node 5 when node 1, node 2, and node 3 establish an IAB network. Here, node 2 may be a parent node of node 1, and node 3 may be a child node of node 1.

Referring to FIG. 22, node 1 may receive detection configuration information from node 2. The detection configuration information may include information about a transmission offset, a transmission beam direction, and the like for a detection signal transmitted by node 1.

Node 1 may also receive a detection signal transmitted by node 4 and/or node 5. Here, the reception operation of node 1 may be performed on the basis of detection signal reception configuration information received from node 2.

Node 1 may transmit feedback information about a detection result to node 2, which is the parent node. Here, the feedback information about the detection result may be transmitted aperiodically.

When detecting node 4 and/or node 5, node 1 may transmit a measurement signal to node 4 and/or node 5. Here, node 1 may also receive a measurement signal transmitted from node 4 and/or node 5. Further, node 1 may perform a measurement operation on the basis of a measurement configuration received from node 2. In this case, node 1 may transmit measurement feedback information including a measurement result to node 2, which is the parent node. Here, the measurement feedback information may be transmitted periodically.

Node 1 may measure node 4 and/or node 5 and determine whether to link to node 4 and/or node 5 on the basis of the measurement result. Here, the link may be such that node 1 changes the parent node thereof or may connect the child node thereof. For example, when the results of detection and measurement by node 1 show that the state of a connection with node 4 or the quality of communication therewith is better than that with node 2, node 1 may change the parent node from node 2 to node 4.

Although FIG. 22 illustrates only some embodiments of the disclosure, various embodiments proposed in the disclosure may be applied, and a redundant description is will be omitted.

Figure 23:
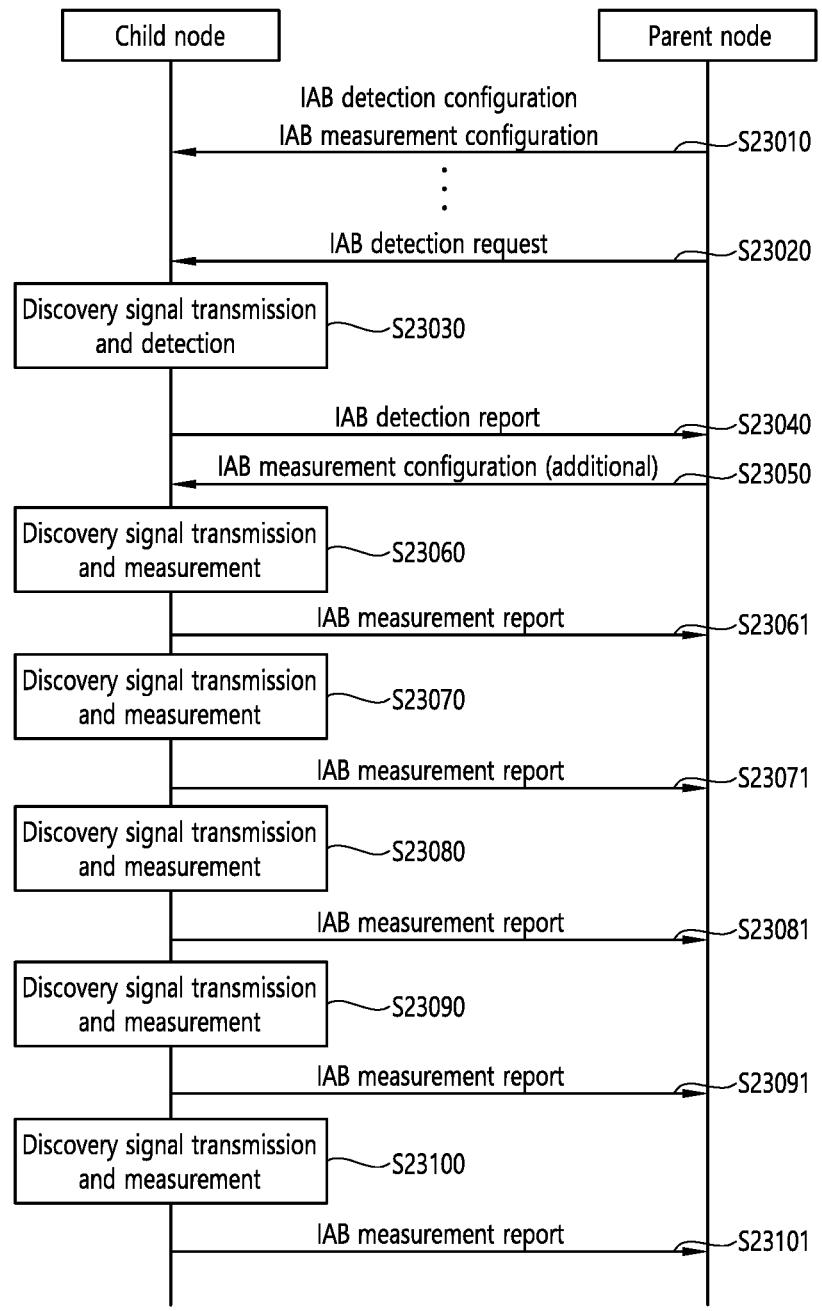
FIG. 23 is a flowchart illustrating a method in which a node perform an aperiodic detection operation and a periodic measurement operation according to an embodiment of the disclosure.

FIG. 23 is a flowchart illustrating a method in which a node perform an aperiodic detection operation and a periodic measurement operation according to an embodiment of the disclosure.

Referring to FIG. 23, a parent node transmits an IAB detection configuration and an IAB measurement configuration to a child node (S23010). Here, the IAB detection configuration and the IAB measurement configuration may be simultaneously transmitted as shown in FIG. 23, or may be separately transmitted. A detailed description of the IAB detection configuration and the IAB measurement configuration is the same as described above, and thus a redundant description is omitted.

The parent node transmits an IAB detection request from the child node (S23020). Here, a detailed description of the IAB detection request is the same as described above, and thus a redundant description is omitted.

The child node performs transmission of a discovery signal and detection in response to the IAB detection request (S23030). Here, a detailed description of the transmission of the discovery signal and the detection is the same as described above, and thus a redundant description is omitted.

The child node transmits an IAB detection report to the parent node (S23040). Here, the IAB detection report may be IAB detection feedback, and the IAB detection report may be performed aperiodically. A detailed description of the IAB detection report is the same as described above, and thus a redundant description is be omitted.

The parent node transmits an IAB measurement configuration to the child node (S23050). This step may be an additional step, a detailed description of which is the same as described above, and thus a redundant description is be omitted.

The child node performs transmission of a discovery signal and measurement and transmits an IAB measurement report to the parent node (S23060 and S23061 to S23100 and S23101). Here, the transmission of the discovery signal and the measurement may be performed periodically with a specific period. The IAB measurement report may also be transmitted periodically. A detailed description of the transmission of the discovery signal and the measurement is the same as described above, and thus a redundant description is omitted.

Figure 24:
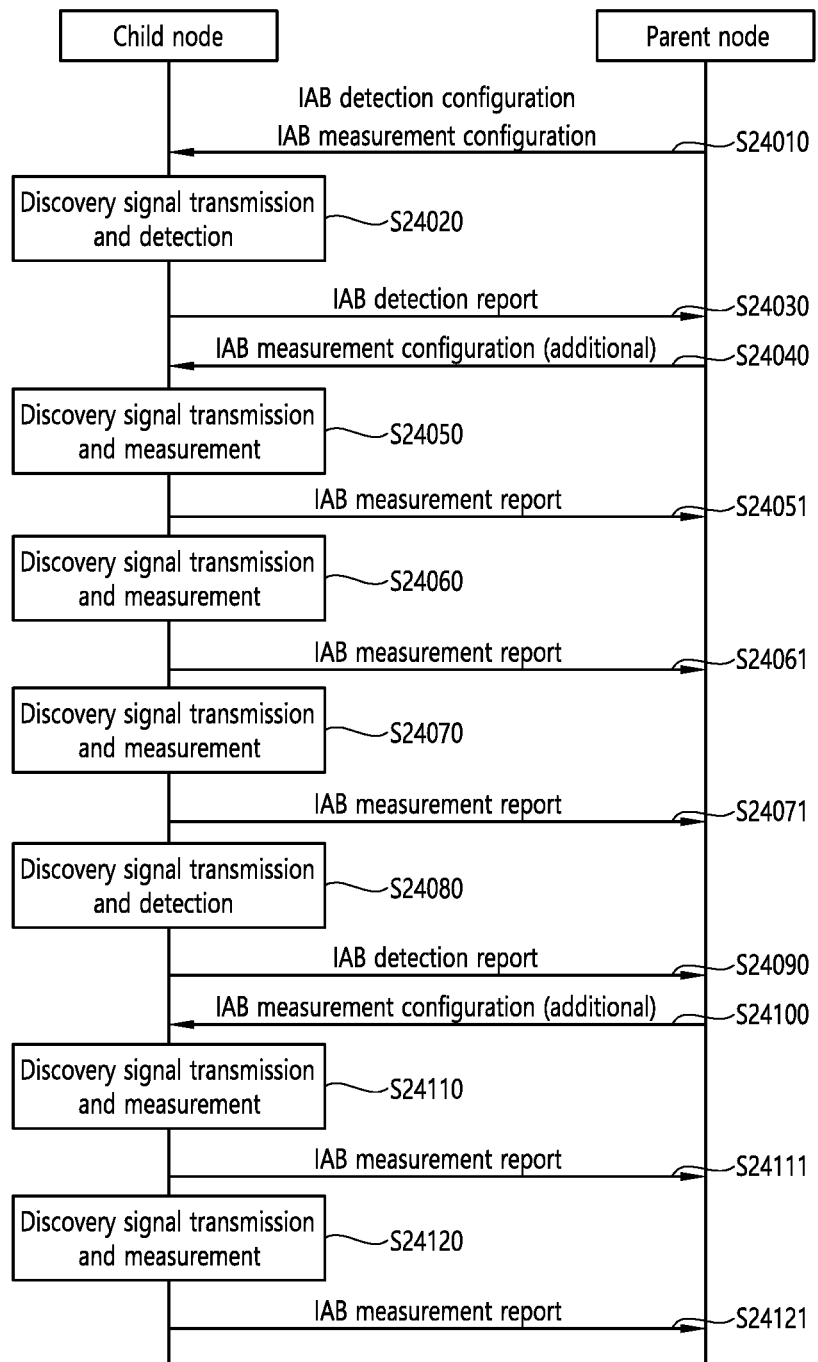
FIG. 24 is a flowchart illustrating a method in which a node perform a periodic detection operation and a periodic measurement operation according to an embodiment of the disclosure.

FIG. 24 is a flowchart illustrating a method in which a node perform a periodic detection operation and a periodic measurement operation according to an embodiment of the disclosure.

Referring to FIG. 24, a parent node transmits an IAB detection configuration and an IAB measurement configuration to a child node (S24010). A detailed description of the IAB detection configuration and the IAB measurement configuration is the same as described above, and thus a redundant description is omitted.

The child node performs transmission of a discovery signal and detection (S24020) and transmits an IAB detection report to the parent node (S24030). Here, the IAB detection report may be IAB detection feedback. Here, a detailed description of the transmission of the discovery signal, the detection, and the IAB detection report is the same as described above, and thus a redundant description is omitted.

The parent node transmits an IAB measurement configuration to the child node (S24040). This step may be an additional step, a detailed description of which is the same as described above, and thus a redundant description is be omitted.

The child node performs transmission of a discovery signal and measurement and transmits an IAB measurement report to the parent node (S24050 and S24051 to S24070 and S24071). Here, the transmission of the discovery signal, the measurement, and the IAB measurement report may be performed periodically with a specific period. A detailed description of each operation is the same as described above, and thus a redundant description is omitted.

The child node performs transmission of a discovery signal and detection (S24080) and transmits an IAB detection report to the parent node (S24090). Here, in FIG. 24, the duration of steps 24020 and S24030 and the duration of the steps 24080 and S24090 may be the same. That is, the transmission of the discovery signal, the detection, and the IAB detection report operation may be performed periodically with a specific period. Here, a detailed description of the transmission of the discovery signal, the detection, and the IAB detection report is the same as described above, and thus a redundant description is omitted.

The parent node transmits an IAB measurement configuration to the child node (S24100). This step may be an additional step, a detailed description of which is the same as described above, and thus a redundant description is be omitted.

The child node performs transmission of a discovery signal and measurement and transmits an IAB measurement report to the parent node (S24110 and S24111 to S24120 and S24121). Here, the transmission of the discovery signal, the measurement, and the IAB measurement report may be performed periodically with a specific period. A detailed description of each operation is the same as described above, and thus a redundant description is omitted.

From the viewpoint of a reception node receiving a detection signal and a measurement signal, when the detection signal is aperiodically transmitted, a detection operation using the detection signal may also be aperiodically performed. In addition, when transmitting detection feedback information, which is information including a detection result, to a parent node thereof, the reception node may aperiodically transmit the detection feedback information to the parent node.

When the measurement signal is periodically transmitted, a measurement operation using the measurement signal may also be periodically performed. In addition, when transmitting measurement feedback information, which is information including a measurement result, to the parent node, the reception node may periodically transmit the measurement feedback information to the parent node.

Further, regardless of the periodicity of the detection signal and the measurement signal, the detection feedback information may be transmitted aperiodically, and the measurement feedback information may be transmitted periodically.

Hereinafter, a device to which the disclosure is applicable will be described.

Figure 25:
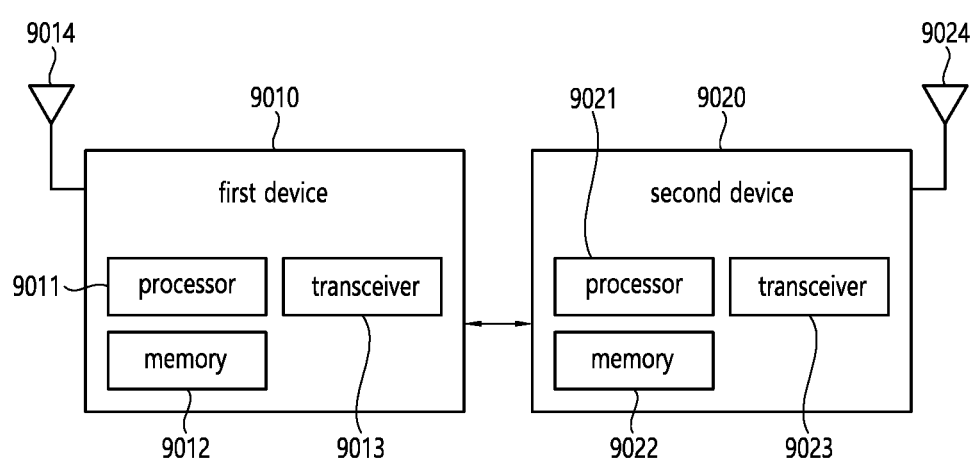
FIG. 25 illustrates a wireless communication device according to an embodiment of the disclosure.

FIG. 25 illustrates a wireless communication device according to an embodiment of the disclosure.

Referring to FIG. 25, a wireless communication system may include a first device 9010 and a second device 9020.

The first device 9010 may be a base station, a network node, a transmission UE, a reception UE, a wireless device, a wireless communication device, a vehicle, a vehicle having an autonomous driving function, a connected car, a unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a financial technology (fintech) device (financial device), a security device, a climate/environment device, a device related to a 5G service, or a device related to the fourth industrial revolution.

The second device 9020 may be a base station, a network node, a transmission UE, a reception UE, a wireless device, a wireless communication device, a vehicle, a vehicle having an autonomous driving function, a connected car, a UAV, an AI module, a robot, an AR device, a VR device, an MR device, a hologram device, a public safety device, an MTC device, an IoT device, a medical device, a fintech device (financial device), a security device, a climate/environment device, a device related to a 5G service, or a device related to the fourth industrial revolution.

For example, a UE may be a mobile phone, a smartphone, a laptop computer, a digital broadcasting UE, a personal digital assistant (PDA), a portable multimedia player (PMP), a navigation device, a slate PC, a tablet PC, an ultrabook, a wearable device (e.g., a smartwatch, smart glasses, and a head-mounted display (HMD)). For example, the HMD may be a display device worn on the head. For example, an HMD may be used to implement VR, AR, or MR.

For example, a UAV may be an aircraft without a human pilot on board, the flight of which operates by a radio control signal. For example, the VR device may include a device for realizing an object or a background in a virtual world. For example, the AR device may include a device for connecting an object or a background in a virtual world to an object or a background in the real world. For example, the MR device may include a device for combining an object or a background in a virtual world with an object or a background in the real world. For example, the hologram device may include a device for realizing a 360-degree stereoscopic image by recording and reproducing stereoscopic information using holography, which is interference of light resulting from two laser beams encountering each other. For example, the public safety device may include an image relay device or an imaging device that can be worn on a user's body. For example, the MTC device and the IoT device may be devices that do not require direct human intervention or manipulation. For example, the MTC device and the IoT device may include a smart meter, a vending machine, a thermometer, a smart bulb, a door lock or various sensors. For example, the medical device may be a device used for diagnosing, treating, alleviating, curing, or preventing a disease. For example, the medical device may be a device used for diagnosing, treating, alleviating, or correcting an injury or a disorder. For example, a medical device may be a device used for inspecting, replacing, or modifying a structure or a function. For example, the medical device may be a device used for controlling pregnancy. For example, the medical device may include a medical device, a surgical device, a (in vitro) diagnostic device, a hearing aid, or a treatment device. For example, the security device may be a device installed to prevent a risk that may occur and to maintain safety. For example, the security device may be a camera, a CCTV, a recorder, or a black box. For example, the fintech device may be a device capable of providing a financial service, such as mobile payment. For example, the fintech device may include a payment device or a point-of-sale (POS) device. For example, the climate/environment device may include a device for monitoring or predicting a climate/environment.

The first device 9010 may include at least one processor, such as a processor 9011, at least one memory, such as a memory 9012, and at least one transceiver, such as a transceiver 9013. The processor 9011 may perform the foregoing functions, procedures, and/or methods. The processor 9011 may perform one or more protocols. For example, the processor 9011 may implement one or more layers of radio interface protocols. The memory 9012 may be connected to the processor 9011 and may store various types of information and/or commands. The transceiver 9013 may be connected to the processor 9011 and may be controlled to transmit and receive a radio signal.

The second device 9020 may include at least one processor, such as a processor 9021, at least one memory, such as a memory 9022, and at least one transceiver, such as a transceiver 9023. The processor 9021 may perform the foregoing functions, procedures, and/or methods. The processor 9021 may perform one or more protocols. For example, the processor 9021 may implement one or more layers of radio interface protocols. The memory 9022 may be connected to the processor 9021 and may store various types of information and/or commands. The transceiver 9023 may be connected to the processor 9021 and may be controlled to transmit and receive a radio signal.

The memory 9012 and/or the memory 9022 may be connected inside or outside the processor 9011 and/or the processor 9021, respectively, and may also be connected to other processors through various techniques, such as a wired or wireless connection.

The first device 9010 and/or the second device 9020 may have one or more antennas. For example, an antenna 9014 and/or an antenna 9024 may be configured to transmit and receive a radio signal.

Figure 26:
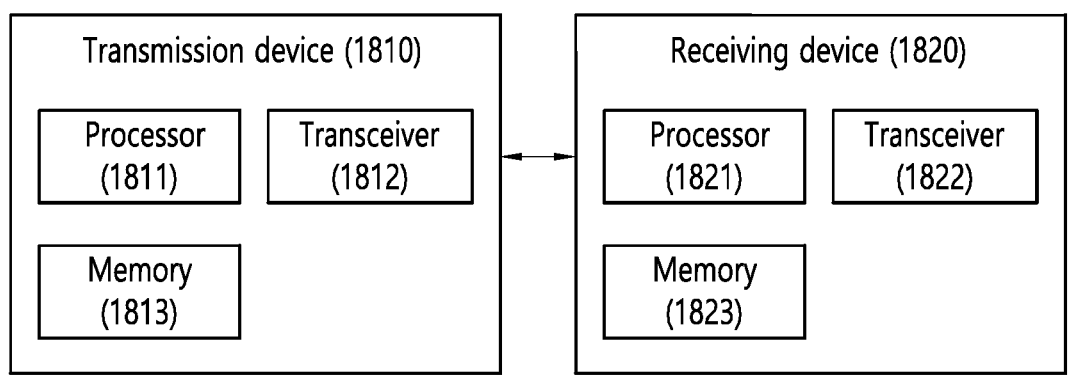
FIG. 26 is a block diagram showing components of a transmitting device 1810 and a receiving device 1820 for implementing the present disclosure.

FIG. 26 is a block diagram showing components of a transmitting device 1810 and a receiving device 1820 for implementing the present disclosure. Here, the transmitting device and the receiving device may be a base station and a terminal.

The transmitting device 1810 and the receiving device 1820 may respectively include transceivers 1812 and 1822 capable of transmitting or receiving radio frequency (RF) signals carrying information, data, signals and messages, memories 1813 and 1823 for storing various types of information regarding communication in a wireless communication system, and processors 1811 and 1821 connected to components such as the transceivers 1812 and 1822 and the memories 1813 and 1823 and configured to control the memories 1813 and 1823 and/or the transceivers 1812 and 1822 such that the corresponding devices perform at least one of embodiments of the present disclosure.

The memories 1813 and 1823 can store programs for processing and control of the processors 1811 and 1821 and temporarily store input/output information. The memories 1813 and 1823 may be used as buffers.

The processors 1811 and 1821 generally control overall operations of various modules in the transmitting device and the receiving device. Particularly, the processors 1811 and 1821 can execute various control functions for implementing the present disclosure. The processors 1811 and 1821 may be referred to as controllers, microcontrollers, microprocessors, microcomputers, etc. The processors 1811 and 1821 can be realized by hardware, firmware, software or a combination thereof. When the present disclosure is realized using hardware, the processors 1811 and 1821 may include ASICs (application specific integrated circuits), DSPs (digital signal processors), DSPDs (digital signal processing devices), PLDs (programmable logic devices), FPGAs (field programmable gate arrays) or the like configured to implement the present disclosure. When the present disclosure is realized using firmware or software, the firmware or software may be configured to include modules, procedures or functions for performing functions or operations of the present disclosure, and the firmware or software configured to implement the present disclosure may be included in the processors 1811 and 1821 or stored in the memories 1813 and 1823 and executed by the processors 1811 and 1821.

The processor 1811 of the transmitting device 1810 can perform predetermined coding and modulation on a signal and/or data to be transmitted to the outside and then transmit the signal and/or data to the transceiver 1812. For example, the processor 1811 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 1812 may include an oscillator for frequency up-conversion. The transceiver 1812 may include one or multiple transmission antennas.

The signal processing procedure of the receiving device 1820 may be reverse to the signal processing procedure of the transmitting device 1810. The transceiver 1822 of the receiving device 1820 can receive RF signals transmitted from the transmitting device 1810 under the control of the processor 1821. The transceiver 1822 may include one or multiple reception antennas. The transceiver 1822 can frequency-down-convert signals received through the reception antennas to restore baseband signals. The transceiver 1822 may include an oscillator for frequency down conversion. The processor 1821 can perform decoding and demodulation on RF signals received through the reception antennas to restore data that is intended to be transmitted by the transmitting device 1810.

The transceivers 1812 and 1822 may include one or multiple antennas. The antennas can transmit signals processed by the transceivers 1812 and 1822 to the outside or receive RF signals from the outside and deliver the RF signal to the transceivers 1812 and 1822 under the control of the processors 1811 and 1821 according to an embodiment of the present disclosure. The antennas may be referred to as antenna ports. Each antenna may correspond to one physical antenna or may be configured by a combination of a plurality of physical antenna elements. A signal transmitted from each antenna cannot be decomposed by the receiving device 1820. A reference signal (RS) transmitted corresponding to an antenna defines an antenna from the viewpoint of the receiving device 1820 and can allow the receiving device 1820 to be able to estimate a channel with respect to the antenna irrespective of whether the channel is a single radio channel from a physical antenna or a composite channel from a plurality of physical antenna elements including the antenna. Tat is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 27:
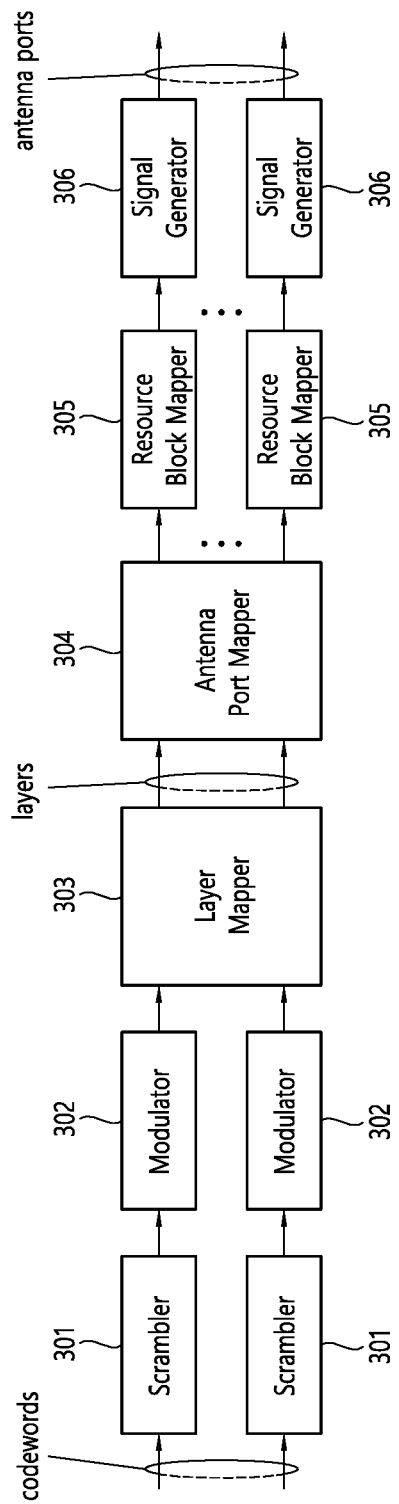
FIG. 27 illustrates an example of a signal processing module structure in the transmitting device 1810.

FIG. 27 illustrates an example of a signal processing module structure in the transmitting device 1810. Here, signal processing can be performed by a processor of a base station/terminal, such as the processors 1811 and 1821 of FIG. 26.

Referring to FIG. 27, the transmitting device 1810 included in a terminal or a base station may include scramblers 301, modulators 302, a layer mapper 303, an antenna port mapper 304, resource block mappers 305 and signal generators 306.

The transmitting device 1810 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 28:
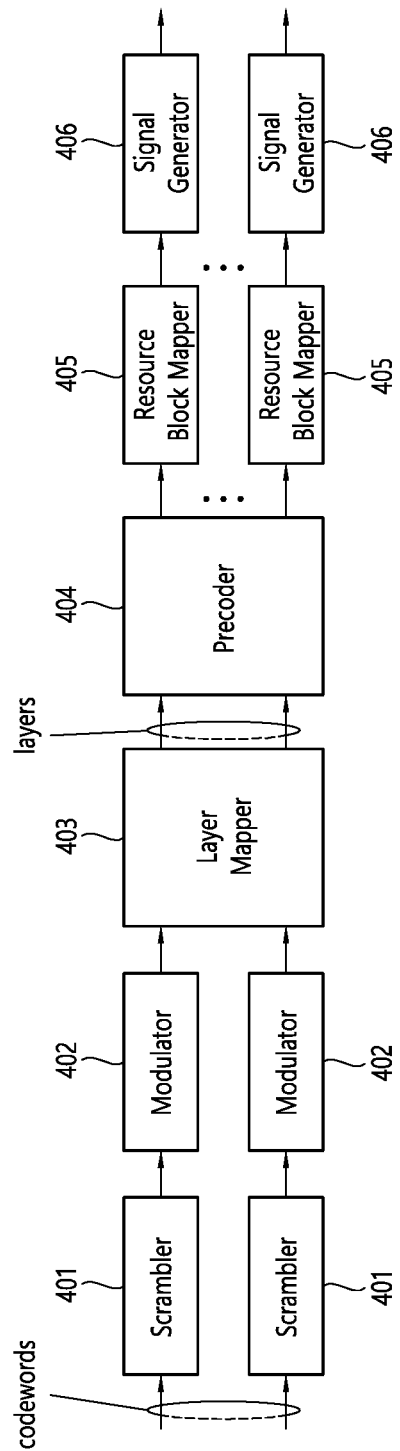
FIG. 28 illustrates another example of the signal processing module structure in the transmitting device 1810.

FIG. 28 illustrates another example of the signal processing module structure in the transmitting device 1810. Here, signal processing can be performed by a processor of a terminal/base station, such as the processors 1811 and 1821 of FIG. 26.

Referring to FIG. 28, the transmitting device 1810 included in a terminal or a base station may include scramblers 401, modulators 402, a layer mapper 403, a precoder 404, resource block mappers 405 and signal generators 406.

The transmitting device 1810 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N*M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device 1820 may be reverse to the signal processing procedure of the transmitting device. Specifically, the processor 1821 of the transmitting device 1810 decodes and demodulates RF signals received through antenna ports of the transceiver 1822. The receiving device 1820 may include a plurality of reception antennas, and signals received through the reception antennas are restored to baseband signals, and then multiplexed and demodulated according to MIMO to be restored to a data string intended to be transmitted by the transmitting device 1810. The receiving device 1820 may include a signal restoration unit for restoring received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit for removing a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 29:
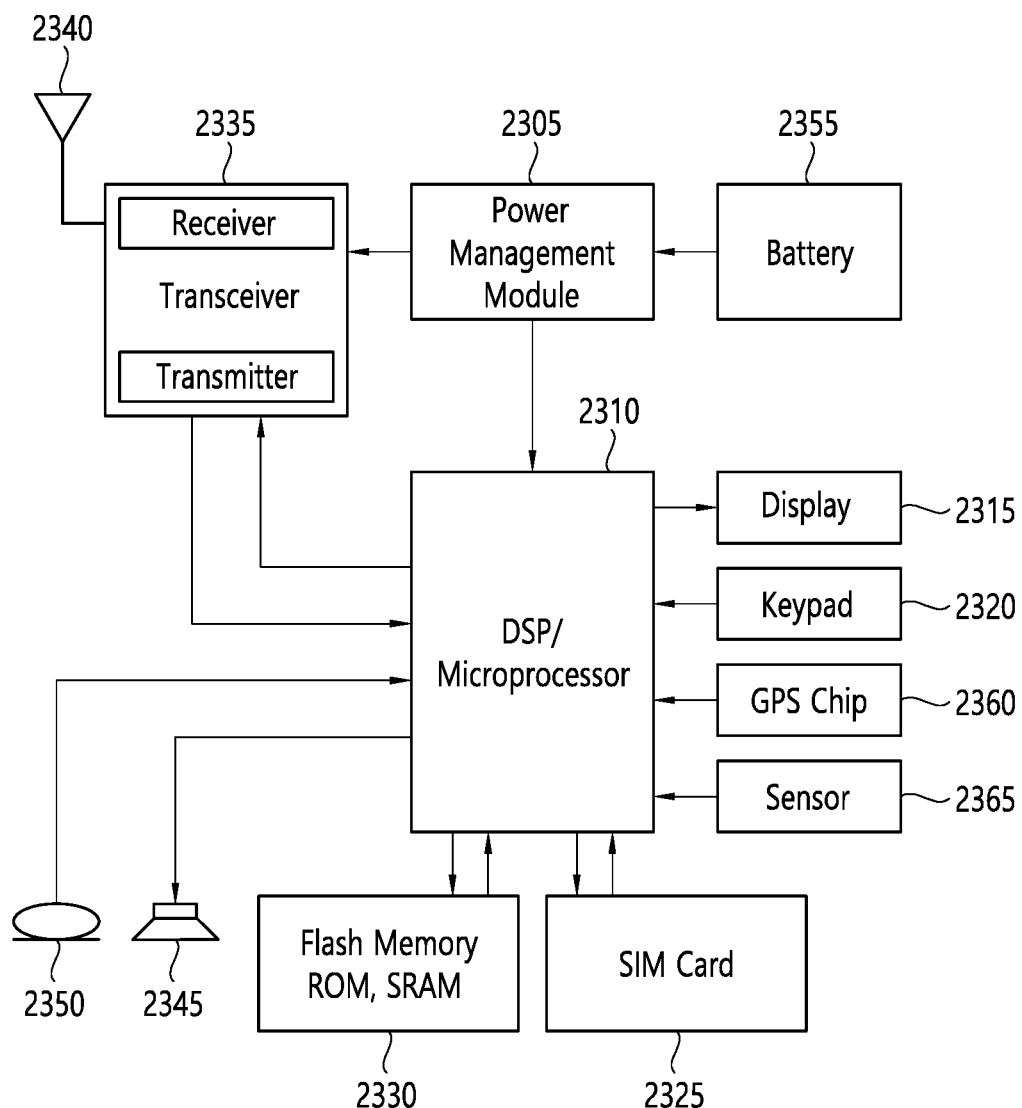
FIG. 29 illustrates an example of a wireless communication device according to an implementation example of the present disclosure.

FIG. 29 illustrates an example of a wireless communication device according to an implementation example of the present disclosure.

Referring to FIG. 29, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 29 may be the processors 1811 and 1821 in FIG. 26.

The memory 2330 is connected to the processor 2310 and stores information related to operations of the processor. The memory may be located inside or outside the processor and connected to the processor through various techniques such as wired connection and wireless connection. The memory 2330 in FIG. 29 may be the memories 1813 and 1823 in FIG. 26.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions.

In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 29 may be the transceivers 1812 and 1822 in FIG. 26.

Although not shown in FIG. 29, various components such as a camera and a universal serial bus (USB) port may be additionally included in the terminal. For example, the camera may be connected to the processor 2310.

FIG. 29 is an example of implementation with respect to the terminal and implementation examples of the present disclosure are not limited thereto. The terminal need not essentially include all the components shown in FIG. 29. That is, some of the components, for example, the keypad 2320, the GPS chip 2360, the sensor 2365 and the SIM card 2325 may not be essential components. In this case, they may not be included in the terminal.

Figure 30:
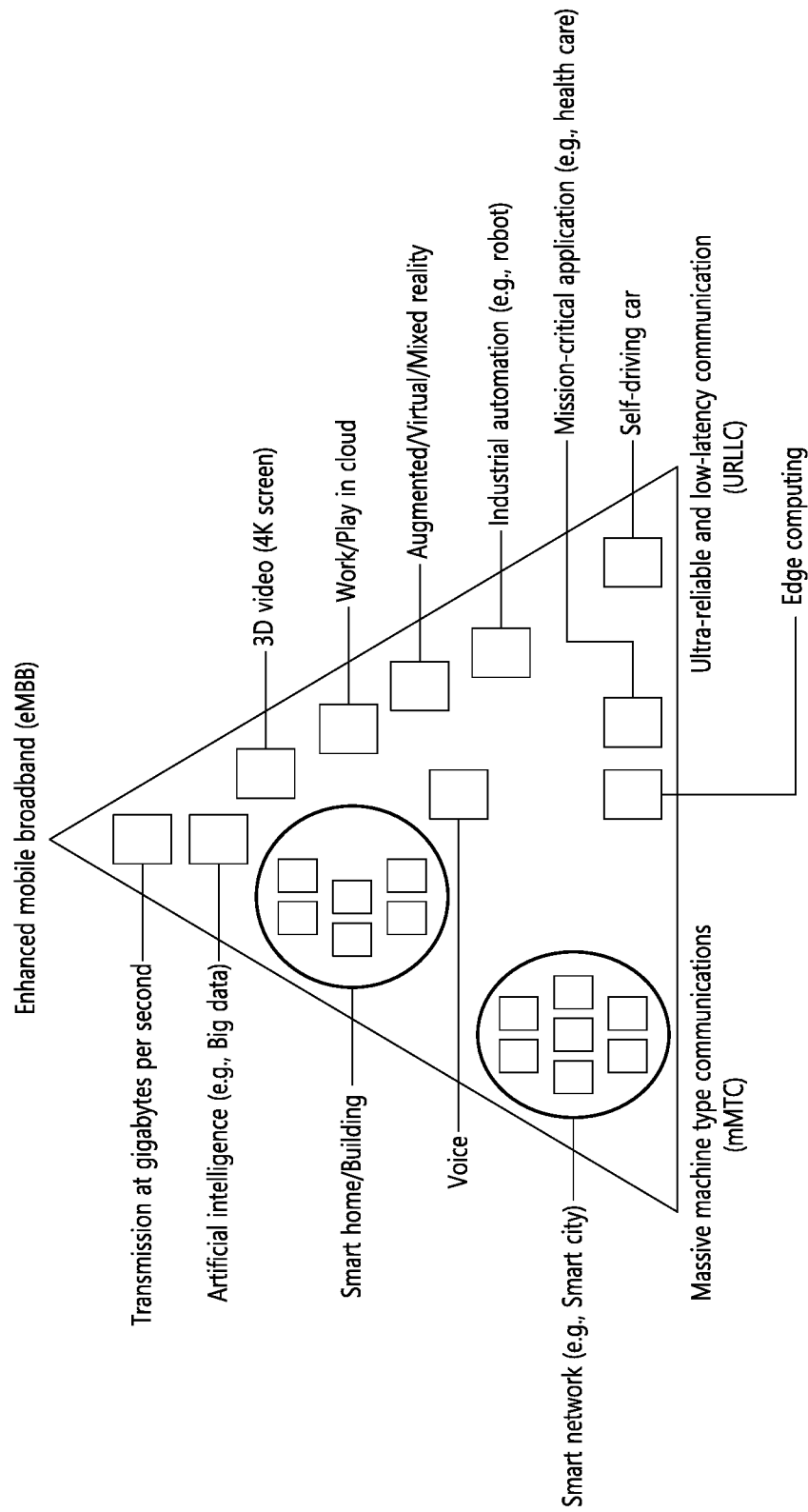
FIG. 30 shows examples of 5G usage scenarios to which the technical features of the present disclosure can be applied.

FIG. 30 shows examples of 5G usage scenarios to which the technical features of the present disclosure can be applied. The 5G usage scenarios shown in FIG. 30 are only exemplary, and the technical features of the present disclosure can be applied to other 5G usage scenarios which are not shown in FIG. 30.

Referring to FIG. 30, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 30 will be described in more detail.

G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Hereinafter, technical fields to which the present disclosure can be applied fusionally will be described.

<Artificial Intelligence: AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value.

An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse.

Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc.

The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method.

Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot.

Robots can be classified into industrial, medical, household, military, etc., depending on the purpose and field of use.

The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user.

For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set.

The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc.

Herein, the autonomous vehicle can be regarded as a robot having an autonomous driving function.

<eXtended Reality: XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world.

MR technology is similar to AR technology in that it shows real and virtual objects together. However, in the AR technology, the virtual object is used as a complement to the real object, whereas in the MR technology, the virtual object and the real object are used in an equal manner.

XR technology can be applied to HMD, head-up display (HUD), mobile phone, tablet PC, laptop, desktop, TV, digital signage. A device to which the XR technology is applied may be referred to as an XR device.

Figure 31:
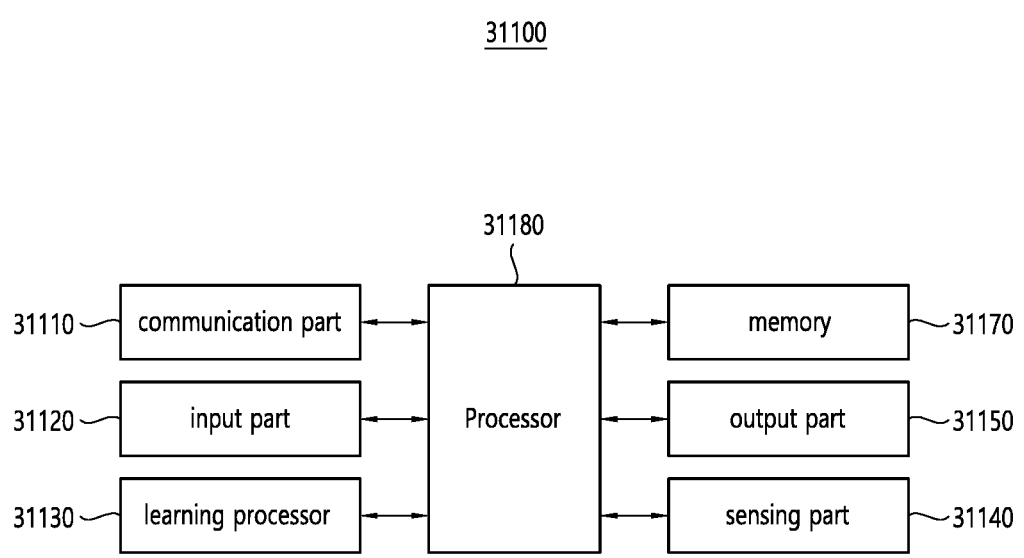
FIG. 31 shows an example of an AI device 31100 to which the technical features of the present disclosure can be applied.

FIG. 31 shows an example of an AI device 31100 to which the technical features of the present disclosure can be applied.

The AI device 31100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 31, the AI device 31100 may include a communication part 31110, an input part 31120, a learning processor 31130, a sensing part 31140, an output part 31150, a memory 31170, and a processor 31180.

The communication part 31110 can transmit and/or receive data to and/or from external devices such as the AI devices and the AI server using wire and/or wireless communication technology. For example, the communication part 31110 can transmit and/or receive sensor information, a user input, a learning model, and a control signal with external devices.

The communication technology used by the communication part 31110 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 31120 can acquire various kinds of data.

Herein, the input part 31120 may include a camera for inputting a video signal, a microphone for receiving an audio signal, and a user input part for receiving information from a user. Herein, a camera and/or a microphone may be treated as a sensor, and a signal obtained from a camera and/or a microphone may be referred to as sensing data and/or sensor information.

The input part 31120 can acquire input data to be used when acquiring an output using learning data and a learning model for model learning. The input part 31120 may obtain raw input data, in which case the processor 31180 or the learning processor 31130 may extract input features by preprocessing the input data.

The learning processor 31130 may learn a model composed of an ANN using learning data. Herein the learned ANN can be referred to as a learning model. The learning model can be used to infer result values for new input data rather than learning data, and the inferred values can be used as a basis for determining which actions to perform.

Herein, the learning processor 31130 may perform AI processing together with the learning processor 31240 of the AI server 31200.

Herein, the learning processor 31130 may include a memory integrated and/or implemented in the AI device 31100. Alternatively, the learning processor 31130 may be implemented using the memory 31170, an external memory directly coupled to the AI device 31100, and/or a memory maintained in an external device.

The sensing part 31140 may acquire at least one of internal information of the AI device 31100, environment information of the AI device 31100, and/or the user information using various sensors.

Herein, the sensors included in the sensing part 31140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 31150 may generate an output related to visual, auditory, tactile, etc.

Herein, the output part 31150 may include a display unit for outputting visual information, a speaker for outputting auditory information, and/or a haptic module for outputting tactile information.

The memory 31170 may store data that supports various functions of the AI device 31100. For example, the memory 31170 may store input data acquired by the input part 31120, learning data, a learning model, a learning history, etc.

The processor 31180 may determine at least one executable operation of the AI device 31100 based on information determined and/or generated using a data analysis algorithm and/or a machine learning algorithm. The processor 31180 may then control the components of the AI device 31100 to perform the determined operation.

Therefore, the processor 31180 may request, retrieve, receive, and/or utilize data in the learning processor 31130 and/or the memory 31170, and may control the components of the AI device 31100 to execute the predicted operation and/or the operation determined to be desirable among the at least one executable operation.

Herein, the processor 31180 may generate a control signal for controlling the external device, and may transmit the generated control signal to the external device, when the external device needs to be linked to perform the determined operation.

The processor 31180 may obtain the intention information for the user input and determine the user's requirements based on the obtained intention information.

Herein, the processor 31180 may use at least one of a speech-to-text (STT) engine for converting speech input into a text string and/or a natural language processing (NLP) engine for acquiring intention information of a natural language, to obtain the intention information corresponding to the user input.

Herein, at least one of the STT engine and/or the NLP engine may be configured as an ANN, at least a part of which is learned according to a machine learning algorithm. At least one of the STT engine and/or the NLP engine may be learned by the learning processor 31130 and/or learned by the learning processor of the AI server, and/or learned by their distributed processing.

The processor 31180 may collect history information including the operation contents of the AI device 31100 and/or the user's feedback on the operation, etc. The processor 31180 may store the collected history information in the memory 31170 and/or the learning processor 31130, and/or transmit to an external device such as the AI server. The collected history information can be used to update the learning model.

The processor 31180 may control at least some of the components of AI device 31100 to drive an application program stored in memory 31170. Furthermore, the processor 31180 may operate two or more of the components included in the AI device 31100 in combination with each other for driving the application program.

Figure 32:
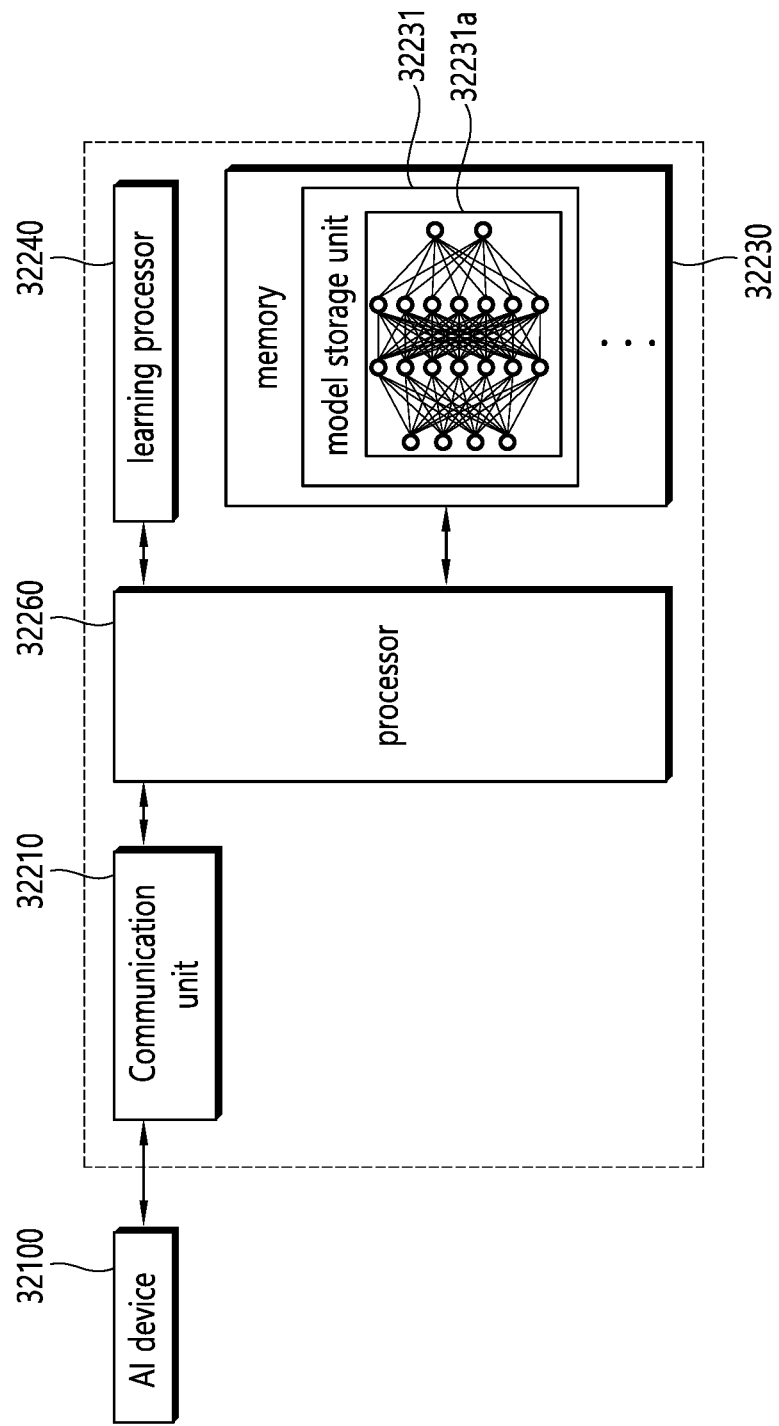
FIG. 32 illustrates an AI server 32200 according to an embodiment of the disclosure.

FIG. 32 illustrates an AI server 32200 according to an embodiment of the disclosure.

Referring to FIG. 32, the AI server 32200 may refer to a device that learns an artificial neural network using a machine learning algorithm or uses a learned artificial neural network. Here, the AI server 32200 may include a plurality of servers to perform distributed processing and may be defined as a 5G network. Here, the AI server 32200 may be included as a component of an AI device 32100 to perform at least part of AI processing together.

The AI server 32200 may include a communication unit 32210, a memory 32230, a learning processor 32240, and a processor 32260.

The communication unit 32210 may transmit and receive data to and from an external device, such as the AI device 32100.

The memory 32230 may include a model storage unit 32231. The model storage unit 32231 may store a model (or an artificial neural network 32231a) being learned or having been learned through the learning processor 32240.

The learning processor 32240 may train the artificial neural network 32231a using learning data. A learning model may be mounted and used in the AI server 32200 of the artificial neural network, or may be mounted and used in an external device, such as the AI device 32100.

The learning model may be configured as hardware, software, or a combination of hardware and software. When part or the entirety of the learning model is configured as software, one or more instructions included in the learning model may be stored in the memory 32230.

The processor 32260 may infer a result value with respect to new input data using the learning model and may generate a response or a control command on the basis of the inferred result value.

Figure 33:
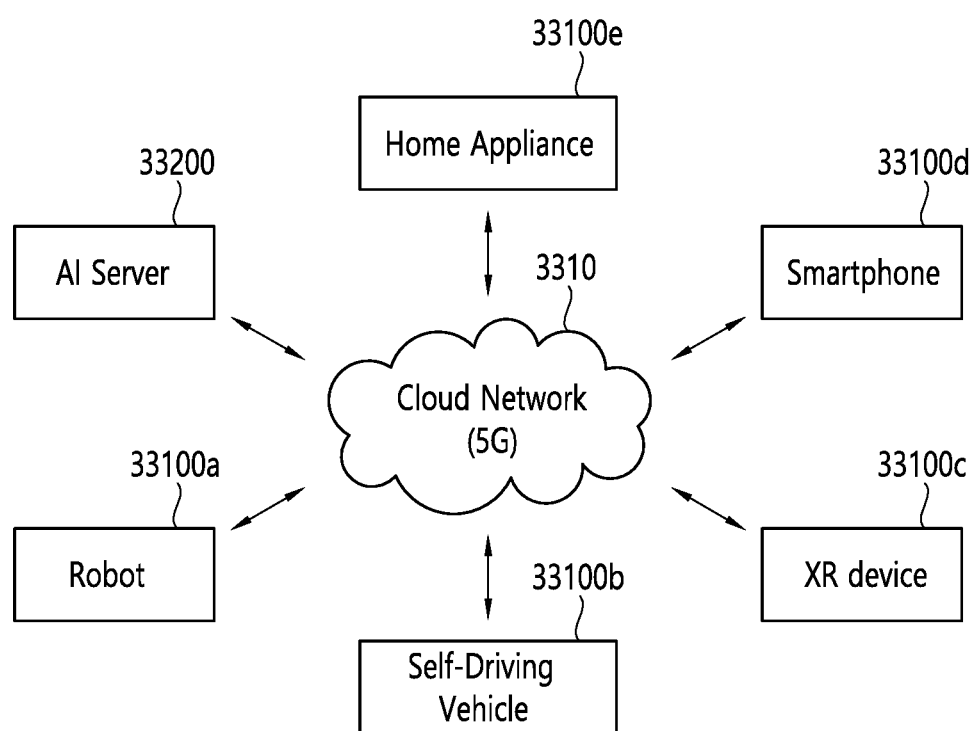
FIG. 33 shows an example of an AI system 331 to which the technical features of the present disclosure can be applied.

FIG. 33 shows an example of an AI system 331 to which the technical features of the present disclosure can be applied.

Referring to FIG. 33, in the AI system 331, at least one of an AI server 33200, a robot 33100a, an autonomous vehicle 33100b, an XR device 33100c, a smartphone 33100d and/or a home appliance 33100e is connected to a cloud network 33010. The robot 33100a, the autonomous vehicle 33100b, the XR device 33100c, the smartphone 33100d, and/or the home appliance 33100e to which the AI technology is applied may be referred to as AI devices 33100a to 33100e.

The cloud network 33010 may refer to a network that forms part of a cloud computing infrastructure and/or resides in a cloud computing infrastructure. The cloud network 33010 may be configured using a 3G network, a 4G or LTE network, and/or a 5G network.

That is, each of the devices 33100a to 33100e and 33200 consisting the AI system may be connected to each other through the cloud network 33010. In particular, each of the devices 33100a to 33100e and 33200 may communicate with each other through a base station, but may directly communicate with each other without using a base station.

The AI server 33200 may include a server for performing AI processing and a server for performing operations on big data.

The AI server 33200 is connected to at least one or more of AI devices constituting the AI system 331, i.e. the robot 33100a, the autonomous vehicle 33100b, the XR device 33100c, the smartphone 33100d and/or the home appliance 33100e through the cloud network 33010, and may assist at least some AI processing of the connected AI devices 33100a to 33100e.

The AI server 33200 can learn the ANN according to the machine learning algorithm on behalf of the AI devices 33100a to 33100e, and can directly store the learning models and/or transmit them to the AI devices 33100a to 33100e.

The AI server 33200 may receive the input data from the AI devices 33100a to 33100e, infer the result value with respect to the received input data using the learning model, generate a response and/or a control command based on the inferred result value, and transmit the generated data to the AI devices 33100a to 33100e.

Alternatively, the AI devices 33100a to 33100e may directly infer a result value for the input data using a learning model, and generate a response and/or a control command based on the inferred result value.

Various embodiments of the AI devices 33100a to 33100e to which the technical features of the present disclosure can be applied will be described. The AI devices 33100a to 33100e shown in FIG. 33 can be seen as specific embodiments of the AI device 31100 shown in FIG. 31.

<AI+Robot>

The robot 33100a may be implemented as a guide robot, a carrying robot, a cleaning robot, a wearable robot, an entertainment robot, a pet robot, an unmanned flying robot, etc., to which AI technology is applied.

The robot 33100a may include a robot control module for controlling the operation, and the robot control module may refer to a software module and/or a chip implementing the software module.

The robot 33100a may acquire the state information of the robot 33100a using the sensor information acquired from various kinds of sensors and/or detect (recognize) the surrounding environment and/or the object, and/or generate map data, and/or determine a travel route and/or a travel plan, and/or determine a response to user interaction, and/or determine an operation.

The robot 33100a can use the sensor information acquired from at least one sensor among the LIDAR, the radar, and/or the camera to determine the travel route and/or the travel plan.

The robot 33100a can perform the above-described operations using a learning model composed of at least one ANN. For example, the robot 33100a can recognize the surrounding environment and/or the object using the learning model, and can determine the operation using the recognized surrounding information and/or the object information. The learning model may be learned directly from the robot 33100a and/or learned from an external device such as the AI server 33200.

Herein, the robot 33100a can directly generate a result using the learning model and perform an operation. The robot 33100a may transmit sensor information to an external device such as the AI server 33200 and may receive the generated result and perform an operation.

The robot 33100a may determine the travel route and/or the travel plan using at least one of the map data, the object information detected from the sensor information and/or the object information acquired from the external device, and drive the robot 33100a according to the determined travel route and/or travel plan by controlling the driving unit.

The map data may include object identification information on various objects arranged in a space in which the robot 33100a moves. For example, the map data may include object identification information on fixed objects such as walls and doors, and/or on movable objects such as pots and desks. The object identification information may include a name, a type, a distance, and/or a position, etc.

Also, the robot 33100a can perform the operation and/or run by controlling the driving unit based on the control/interaction of the user. The robot 33100a may acquire the intention information of the interaction due to the user's operation and/or voice utterance, determine the response based on the acquired intention information, and perform the operation.

<AI+Autonomous-Driving/Self-Driving>

The autonomous vehicle 33100b may be implemented as a mobile robot, a vehicle, an unmanned aerial vehicle, etc., to which AI technology is applied.

The autonomous vehicle 33100b may include an autonomous driving control module for controlling the autonomous driving function, and the autonomous driving control module may refer to a software module and/or a chip implementing the software module. The autonomous driving control module may be included in the autonomous vehicle 33100b as a component of the autonomous vehicle 33100b, but may be connected to the outside of the autonomous vehicle 1210b with separate hardware.

The autonomous vehicle 33100b may acquire the state information of the autonomous vehicle 33100b using the sensor information acquired from various kinds of sensors and/or detect (recognize) the surrounding environment and/or the object, and/or generate map data, and/or determine a travel route and/or a travel plan, and/or determine an operation.

Like the robot 33100a, the autonomous vehicle 33100b can use the sensor information acquired from at least one sensor among the LIDAR, the radar, and/or the camera to determine the travel route and/or the travel plan.

In particular, the autonomous vehicle 33100b can recognize an environment and/or an object for an area in which the field of view is obscured and/or over a certain distance by receiving sensor information from external devices, and/or receive the recognized information directly from external devices.

The autonomous vehicle 33100b can perform the above-described operations using a learning model composed of at least one ANN. For example, the autonomous vehicle 33100b can recognize the surrounding environment and/or the object using the learning model, and can determine the travel route using the recognized surrounding information and/or the object information. The learning model may be learned directly from the autonomous vehicle 33100b and/or learned from an external device such as the AI server 33200.

The autonomous vehicle 33100b can directly generate a result using the learning model and perform an operation. The autonomous vehicle 33100b may transmit sensor information to an external device such as the AI server 33200 and may receive the generated result and perform an operation.

The autonomous vehicle 33100*b* may determine the travel route and/or the travel plan using at least one of the map data, the object information detected from the sensor information and/or the object information acquired from the external device, and drive the autonomous vehicle 33100*b* according to the determined travel route and/or travel plan by controlling the driving unit.

The map data may include object identification information on various objects arranged in a space (e.g. road) in which the autonomous vehicle 33100*b* moves. For example, the map data may include object identification information on fixed objects such as street lamps, rocks, and buildings, and/or on movable objects such as vehicles and pedestrians. The object identification information may include a name, a type, a distance, and/or a position, etc.

The autonomous vehicle 33100*b* can perform the operation and/or run by controlling the driving unit based on the control/interaction of the user. The autonomous vehicle 33100*b* may acquire the intention information of the interaction due to the user's operation and/or voice utterance, determine the response based on the acquired intention information, and perform the operation.

<AI+XR>

The XR device 33100*c* may be implemented as a HMD, a HUD, a TV, a mobile phone, a smartphone, a computer, a wearable device, a home appliance, a digital signage, a vehicle, a fixed robot, a mobile robot, etc., to which AI technology is applied.

The XR device 33100*c* analyzes the three-dimensional point cloud data and/or image data acquired from various sensors and/or from an external device to generate position data and/or attribute data for the three-dimensional points, thereby obtaining information about the surrounding space and/or the real object, and outputting the rendered XR object. For example, the XR device 33100*c* may output an XR object, which includes the additional information about the recognized object, by corresponding to the recognized object.

The XR device 33100*c* can perform the above-described operations using a learning model composed of at least one ANN. For example, the XR device 33100*c* can recognize a real object from three-dimensional point cloud data and/or image data using the learning model, and can provide information corresponding to the recognized real object. The learning model may be learned directly from the XR device 33100*c* and/or learned from an external device such as the AI server 33200.

The XR device 33100*c* can directly generate a result using the learning model and perform an operation. The XR device 33100*c* may transmit sensor information to an external device such as the AI server 33200 and may receive the generated result and perform an operation.

<AI+Robot+Autonomous-Driving/Self-Driving>

The robot 33100*a* may be implemented as a guide robot, a carrying robot, a cleaning robot, a wearable robot, an entertainment robot, a pet robot, an unmanned flying robot, etc., to which AI technology and autonomous-driving technology are applied.

The robot 33100*a* to which the AI technology and the autonomous-driving technology are applied may mean the robot 33100*a* having the autonomous-driving function itself and/or the robot 33100*a* interacting with the autonomous vehicle 33100*b*.

The robot 33100*a* having an autonomous-driving function can collectively refer to devices that move by themselves in accordance with a given travel route and/or move by determining the traveling route by themselves without user's control.

The robot 33100*a* having the autonomous-driving function and the autonomous vehicle 33100*b* can use a common sensing method to determine at least one of the travel route and/or the travel plan. For example, the robot 33100*a* having the autonomous-driving function and the autonomous vehicle 33100*b* can determine at least one of the travel route and/or the travel plan using the information sensed through the LIDAR, the radar, and/or the camera.

The robot 33100*a* interacting with the autonomous vehicle 33100*b* may exist separately from the autonomous vehicle 33100*b*. The robot 33100*a* interacting with the autonomous vehicle 33100*b* may be associated with the autonomous-driving function inside and/or outside the autonomous vehicle 33100*b*, and/or may perform an operation associated with the user aboard the autonomous vehicle 33100*b*.

The robot 33100*a* interacting with the autonomous vehicle 33100*b* may acquire the sensor information on behalf of the autonomous vehicle 33100*b* and provide it to the autonomous vehicle 33100*b*. The robot 33100*a* interacting with the autonomous vehicle 33100*b* may obtain the sensor information and generate the environment information and/or the object information to provide the autonomous vehicle 33100*b*, thereby controlling and/or assisting the autonomous-driving function of the autonomous vehicle 33100*b*.

The robot 33100*a* interacting with the autonomous vehicle 33100*b* may monitor the user boarding the autonomous vehicle 33100*b* and/or may control the functions of the autonomous vehicle 33100*b* through interaction with the user. For example, when it is determined that the driver is in a drowsy state, the robot 33100*a* may activate the autonomous-driving function of the autonomous vehicle 33100*b* and/or assist the control of the driving unit of the autonomous vehicle 33100*b*. The function of the autonomous vehicle 33100*b* controlled by the robot 33100*a* may include not only an autonomous-driving function but also a function provided by a navigation system and/or an audio system provided in the autonomous vehicle 33100*b*.

The robot 33100*a* interacting with the autonomous vehicle 33100*b* may provide information and/or assist the function to the autonomous vehicle 33100*b* outside the autonomous vehicle 33100*b*. For example, the robot 33100*a*, such as a smart traffic light, may provide traffic information including signal information, etc., to the autonomous vehicle 33100*b*. The robot 33100*a*, such as an automatic electric charger of an electric vehicle, may interact with the autonomous vehicle 33100*b* to connect the electric charger to the charging hole automatically.

<AI+Robot+XR>

The robot 33100*a* may be implemented as a guide robot, a carrying robot, a cleaning robot, a wearable robot, an entertainment robot, a pet robot, an unmanned flying robot, a drone, etc., to which AI technology and XR technology are applied.

The robot 33100*a* to which the XR technology is applied may refer to a robot that is subject to control/interaction in the XR image. In this case, the robot 33100*a* may be separated from the XR device 33100*c* and can be associated with each other.

When the robot 33100*a* that is the subject to control/interaction in the XR image acquires the sensor information from the sensors including the camera, the robot 33100*a* and/or the XR device 33100*c* may generate an XR image based on the sensor information and the XR device 33100c can output the generated XR image. The robot 33100a can operate based on a control signal and/or a user's interaction input through the XR device 33100c.

For example, the user can acknowledge the XR image corresponding to the viewpoint of the robot 33100a remotely linked through the external device such as the XR device 33100c, and can adjust the autonomous travel path of the robot 33100a, control operation and/or driving, or check the information of neighboring objects, through interaction.

<AI+Autonomous-Driving/Self-Driving+XR>

The autonomous vehicle 33100b may be implemented as a mobile robot, a vehicle, an unmanned aerial vehicle, etc., to which AI technology and XR technology are applied.

The autonomous driving vehicle 33100b to which the XR technology is applied may mean an autonomous vehicle having means for providing an XR image and/or an autonomous vehicle that is subject to control/interaction in the XR image. Particularly, the autonomous vehicle 33100b that is subject to control/interaction in the XR image may be separated from the XR device 33100c and can be associated with each other.

The autonomous vehicle 33100b having the means for providing the XR image can acquire the sensor information from the sensors including the camera and output the generated XR image based on the acquired sensor information. For example, the autonomous vehicle 33100b may include an HUD to output an XR image, thereby providing a passenger with a real object and/or an XR object corresponding to an object in the screen.

At this time, when the XR object is output to the HUD, at least a part of the XR object may be output so as to overlap with the actual object that the passenger's gaze is directed to. On the other hand, when the XR object is output to the display provided in the autonomous vehicle 33100b, at least a part of the XR object may be output so as to overlap with the object in the screen. For example, the autonomous vehicle 33100b can output XR objects corresponding to objects such as a lane, another vehicle, a traffic light, a traffic sign, a two-wheeled vehicle, a pedestrian, a building, etc.

When the autonomous vehicle 33100b that is the subject to control/interaction in the XR image acquires the sensor information from the sensors including the camera, the autonomous vehicle 33100b and/or the XR device 33100c may generate an XR image based on the sensor information and the XR device 33100c can output the generated XR image. The autonomous vehicle 33100b can operate based on a control signal and/or a user's interaction input through the XR device 33100c.

What is claimed is:

1. A method for transmitting a synchronization signal block (SSB) in a wireless communication system, the method performed by an integrated access and backhaul (IAB) node and comprising:
   receiving a plurality of configurations related to a transmission of the SSB from a donor IAB node, wherein each of the plurality of configurations informs a periodicity of the SSB and an offset for the SSB, and
   transmitting the SSB based on the plurality of configurations,
   wherein the SSB is for discovery and measurement related to a neighboring node of the IAB node.

2. The method of claim 1, wherein each of the plurality of configurations includes an index for the SSB, and
   wherein the index identifies a beam direction for the SSB.

3. The method of claim 2, wherein the IAB node transmits the SSB based on the beam direction.

4. The method of claim 1, wherein the IAB node receives the plurality of configurations from a parent node of the IAB node.

5. The method of claim 1, wherein at least one of the periodicity and the offset is different per the plurality of configurations.

6. The method of claim 1, wherein the IAB node receives discovery request information, and
   wherein the IAB node transmits the SSB based on the discovery request information.

7. The method of claim 6, wherein the discovery request information is cell-specific or group-specific.

8. The method of claim 1, wherein the SSB includes an identifier (ID) of the IAB node.

9. The method of claim 1, wherein the at least one SSB is transmitted based on time division multiplexing (TDM) manner or frequency division multiplexing (FDM) manner.

10. An integrated access and backhaul (IAB) node, comprising:
    a transceiver; and
    at least one processor, and
    at least one computer memory operably connectable to the at least one processor and storing instructions that, when executed by the at least one processor, perform operations comprising:
    receiving a plurality of configurations related to a transmission of the SSB from a donor IAB node, wherein each of the plurality of configurations informs a periodicity of the SSB and an offset for the SSB, and
    transmitting the SSB based on the plurality of configurations,
    wherein the SSB is for discovery and measurement related to a neighboring node of the IAB node.

* * * * *